(12) United States Patent
Thibodeau

(10) Patent No.: US 12,370,723 B2
(45) Date of Patent: Jul. 29, 2025

(54) METHOD FOR FORMING A VARIABLE THICKNESS PREFORM FOR A BOTTLE

(71) Applicant: DT Inventions, Houston, TX (US)

(72) Inventor: James Alfred Thibodeau, Gahanna, OH (US)

(73) Assignee: DT Inventions, Houston, TX (US)

( * ) Notice: Subject to any disclaimer, the term of this patent is extended or adjusted under 35 U.S.C. 154(b) by 557 days.

(21) Appl. No.: 16/823,605

(22) Filed: Mar. 19, 2020

(65) Prior Publication Data

US 2020/0215722 A1 Jul. 9, 2020

Related U.S. Application Data

(63) Continuation of application No. 15/479,037, filed on Apr. 4, 2017, now Pat. No. 10,703,020.

(51) Int. Cl.
*B29B 11/08* (2006.01)
*B29B 11/14* (2006.01)
(Continued)

(52) U.S. Cl.
CPC ............... *B29B 11/08* (2013.01); *B29B 11/14* (2013.01); *B29C 2049/024* (2013.01);
(Continued)

(58) Field of Classification Search
CPC ......... B29B 11/08; B29B 11/14; B29B 11/10; B29B 11/12; B29B 13/024; B29B 11/06; B29C 2949/07; B29C 2949/079; B29C 2949/0791; B29C 49/071; B29C 49/02; B29C 2949/0768; B29C 2949/0779; B29C 2949/3032; B29C 2949/26; B29C 2949/28; B29C 2949/0763; B29C 2949/0715; B29C 2049/2039; B29C 49/04; B29C 2949/076;
(Continued)

(56) References Cited

U.S. PATENT DOCUMENTS 4,179,488 A * 12/1979 Nishikawa ........... B65D 1/0207
264/907
4,311,246 A * 1/1982 Saito ....................... B29C 49/48
285/112
(Continued)

FOREIGN PATENT DOCUMENTS

CN 101437665 A 5/2009
JP S462042 Y1 1/1971
(Continued)

OTHER PUBLICATIONS

Office Action in counterpart Korean Patent Application No. 10-2019-7032011 issued on Jul. 27, 2020 (15 pages).
(Continued)

*Primary Examiner* — Susan D Leong
*Assistant Examiner* — Jennifer L Groux
(74) *Attorney, Agent, or Firm* — Osha Bergman Watanabe & Burton LLP

(57) ABSTRACT

A method for forming a preform for a container having a hollow cylindrical main body having a first thickness, a hollow cylindrical thick portion having a second thickness greater than the first thickness, and a curved end portion. Inner surfaces of the main body, the thick portion, and the end portion form a cavity.

4 Claims, 19 Drawing Sheets

(51) Int. Cl.
  *B29K 105/00*  (2006.01)
  *B29C 49/02*  (2006.01)
  *B29C 49/06*  (2006.01)
  *B29C 49/10*  (2006.01)

(52) U.S. Cl.
  CPC .............. *B29C 49/06* (2013.01); *B29C 49/10* (2013.01); *B29C 2949/0724* (2022.05); *B29C 2949/0773* (2022.05); *B29C 2949/0791* (2022.05); *B29C 2949/08* (2022.05); *B29C 2949/22* (2022.05); *B29C 2949/24* (2022.05); *B29C 2949/26* (2022.05); *B29C 2949/28* (2022.05); *B29K 2105/258* (2013.01)

(58) Field of Classification Search
  CPC .... B29C 2949/0761; B29C 49/06–064; B29C 2949/072–0734; B29L 2031/7158; B29L 2031/463; B29L 2031/712; B65D 23/10; B65D 1/0207; B65D 1/02; B65D 1/0223; B65D 1/40; B29D 22/003; B29D 22/00
  See application file for complete search history.

(56) References Cited

U.S. PATENT DOCUMENTS

| | | | | |
|---|---|---|---|---|
| 4,725,464 A * | 2/1988 | Collette | ............... | B65D 1/0223 215/16 |
| 4,785,948 A * | 11/1988 | Strassheimer | ....... | B65D 1/0276 220/675 |
| 4,942,008 A * | 7/1990 | Cahill | ............... | B29C 45/14598 264/269 |
| 5,464,106 A * | 11/1995 | Slat | ..................... | B65D 1/0223 215/373 |
| 6,555,191 B1 * | 4/2003 | Smith | .................. | B65D 1/0223 428/524 |
| 8,568,634 B2 | 10/2013 | Porter et al. | | |
| 2006/0065992 A1 | 3/2006 | Hutchinson et al. | | |
| 2012/0088060 A1 | 4/2012 | Huettner | | |
| 2013/0004692 A1 | 1/2013 | Hutts et al. | | |
| 2014/0131920 A1 * | 5/2014 | Nakahara | ................ | B29B 11/08 264/328.16 |
| 2014/0302268 A1 * | 10/2014 | Ogata | ..................... | B29B 11/08 264/537 |
| 2015/0044620 A1 * | 2/2015 | Beale | ..................... | B29C 49/061 432/124 |
| 2015/0217554 A1 * | 8/2015 | Cerveny | .............. | B65D 1/0223 156/60 |
| 2016/0082645 A1 * | 3/2016 | Brunson | ................ | B29C 49/482 425/525 |
| 2017/0057685 A1 * | 3/2017 | Pedmo | ................. | B65D 1/0276 |

FOREIGN PATENT DOCUMENTS

| | | |
|---|---|---|
| JP | H07156933 A | 6/1995 |
| JP | 2009529437 A | 8/2009 |
| KR | 2016-0111460 A | 9/2016 |

OTHER PUBLICATIONS

Office Action issued in Malaysian Application No. PI2019005822; Dated Jun. 21, 2022 (3 pages).
Office Action issued in Brazilian Application No. BR112019020801-1; Dated Jul. 7, 2022 (7 pages).
Office Action issued in Mexican Application No. MX/A/2019/011892; Dated Jun. 22, 2022 (6 pages).
Examination Report issued in Australian Application No. 2018250176, mailed on Feb. 1, 2021 (4 pages).
Office Action issued in the counterpart Indian Patent Application No. 201927044621, mailed on Feb. 11, 2021 (7 pages).
Office Action issued in the counterpart Chinese Patent Application No. 201880032888.3, mailed on Feb. 25, 2021 (9 pages).
Office Action issued in Japanese Application No. 2019-554744; Dated Oct. 27, 2020 (6 pages).
Office Action issued in Australian Application No. 2018250176; Dated Oct. 15, 2020 (4 pages).

\* cited by examiner

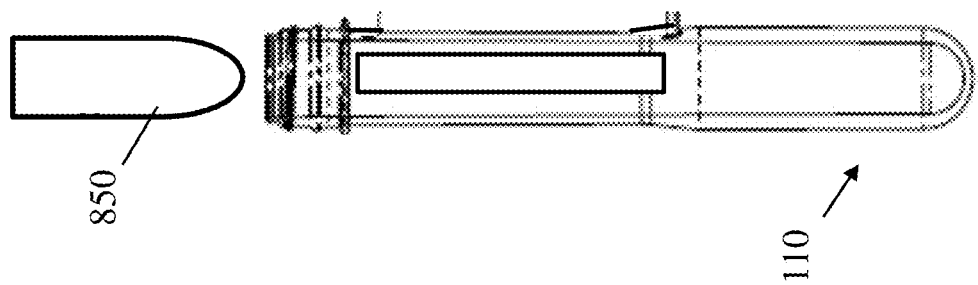
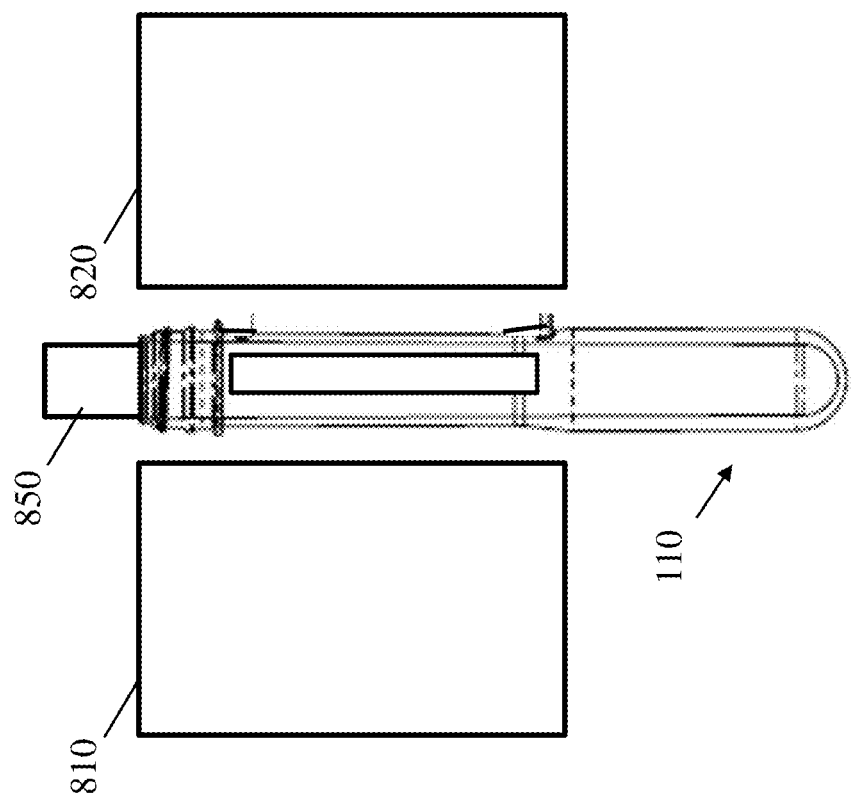

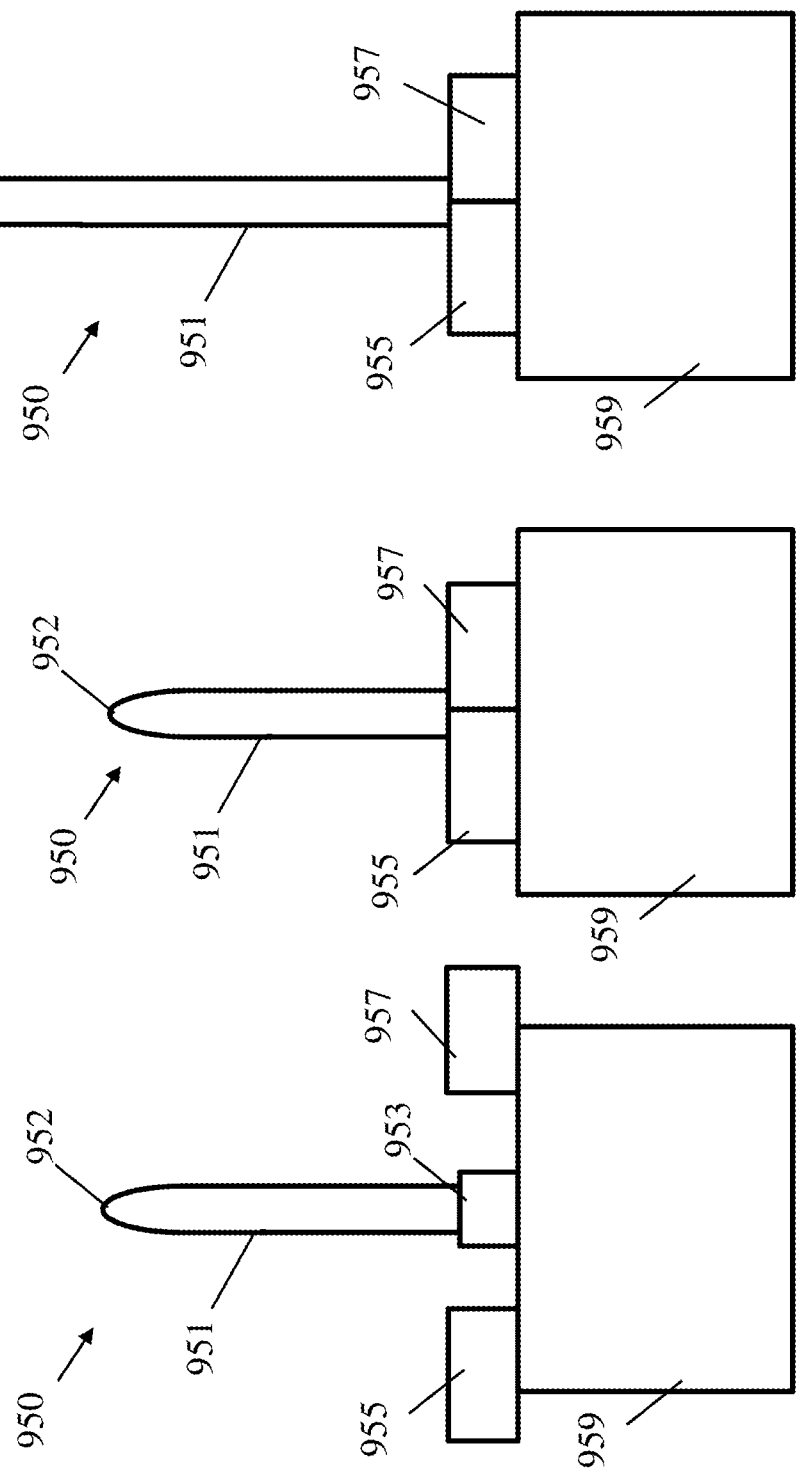

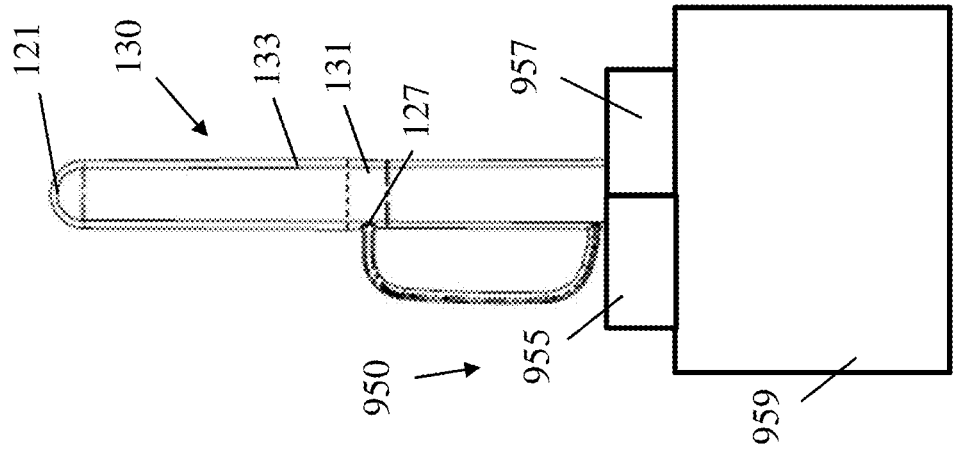
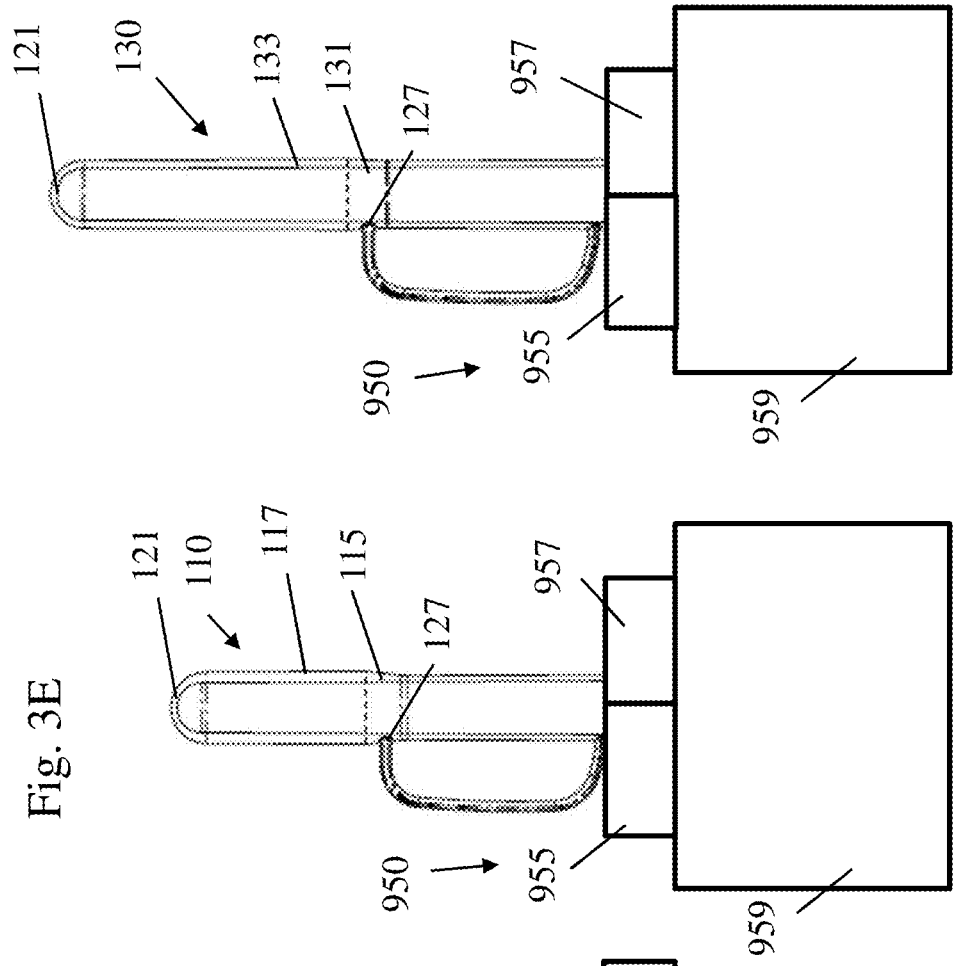
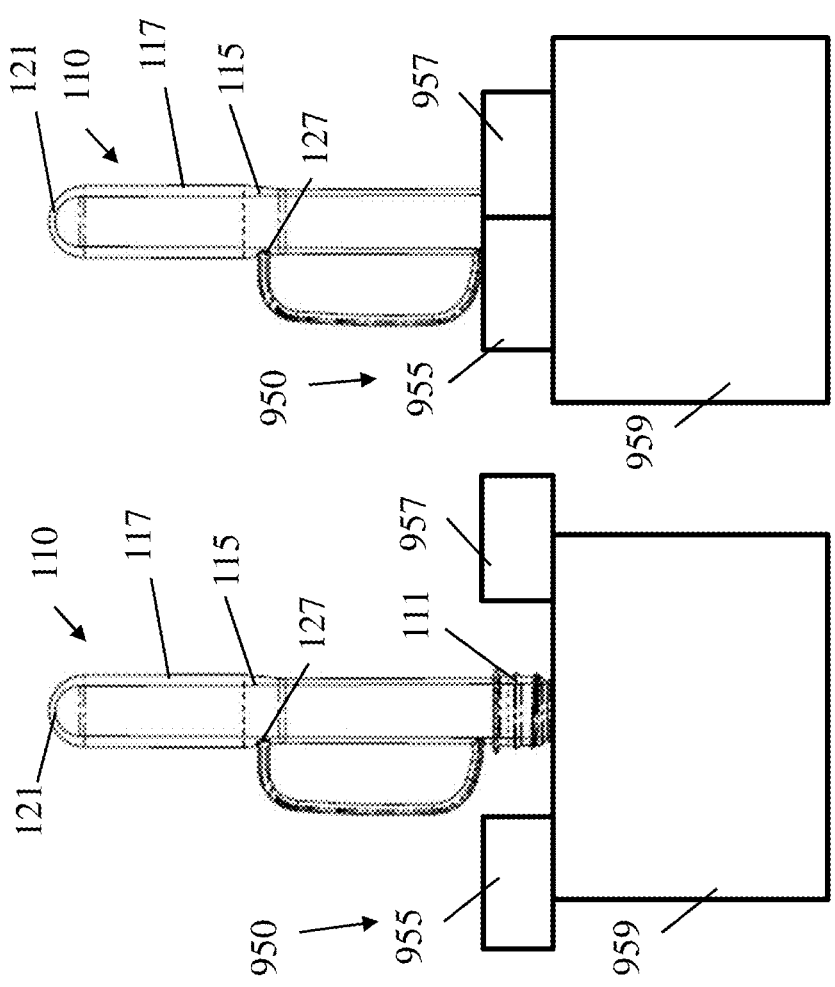

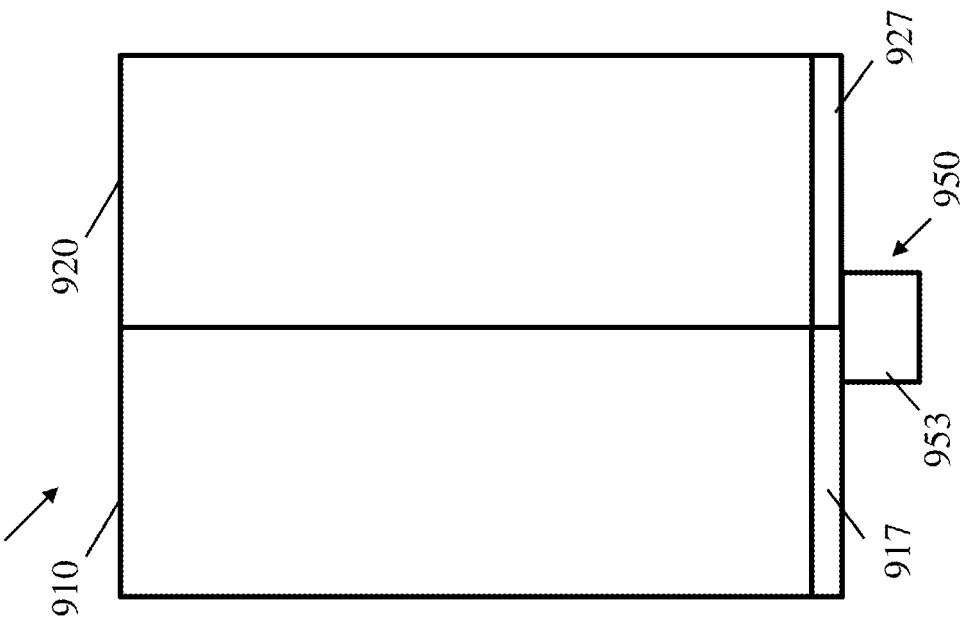
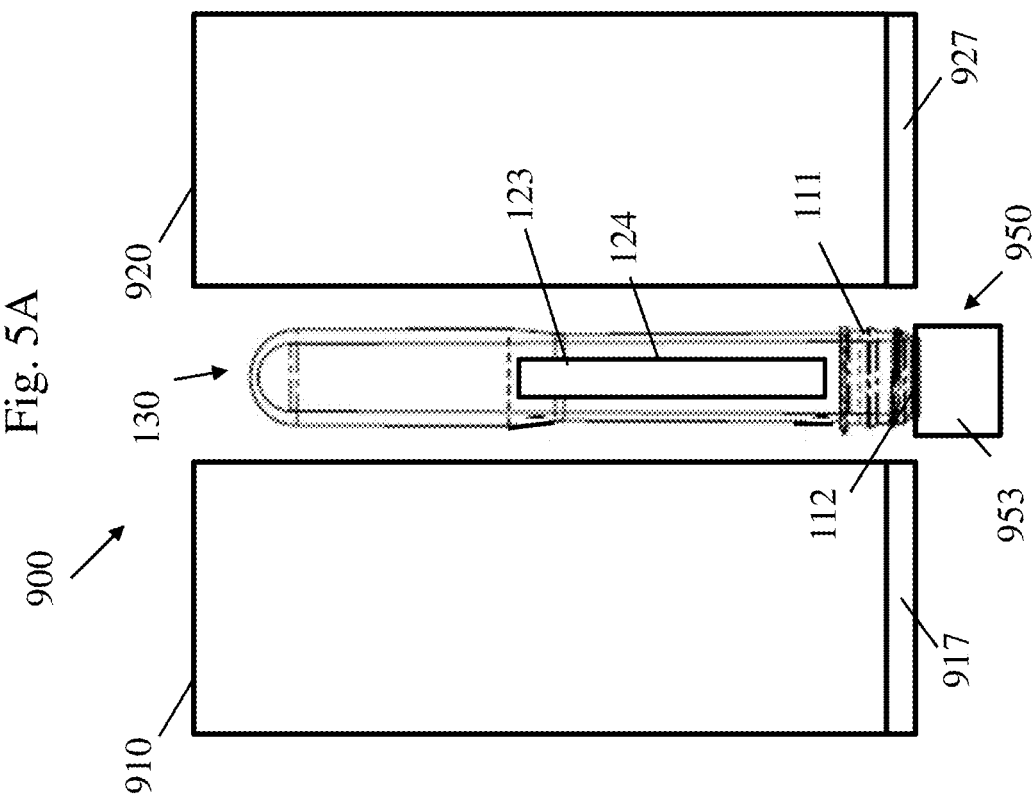

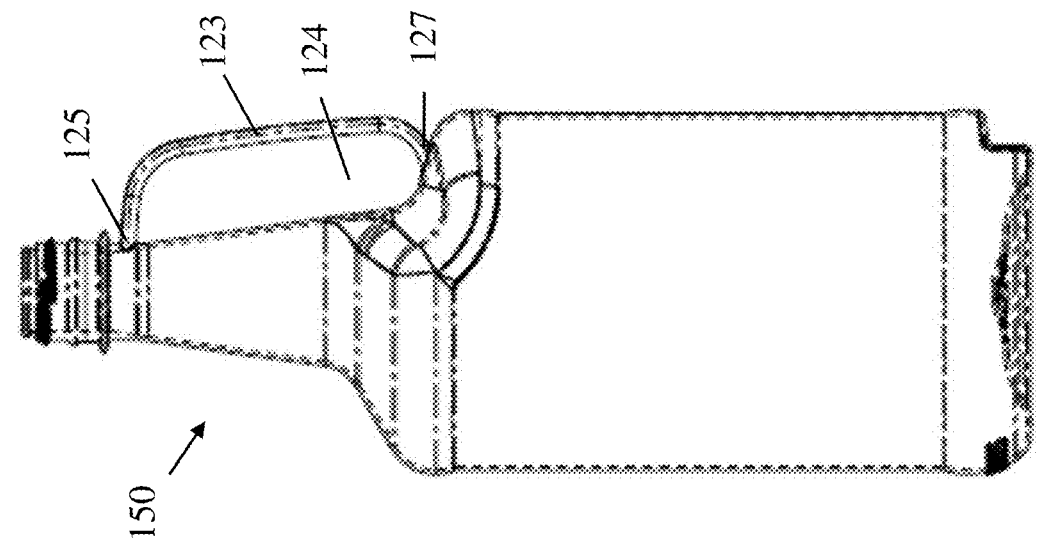
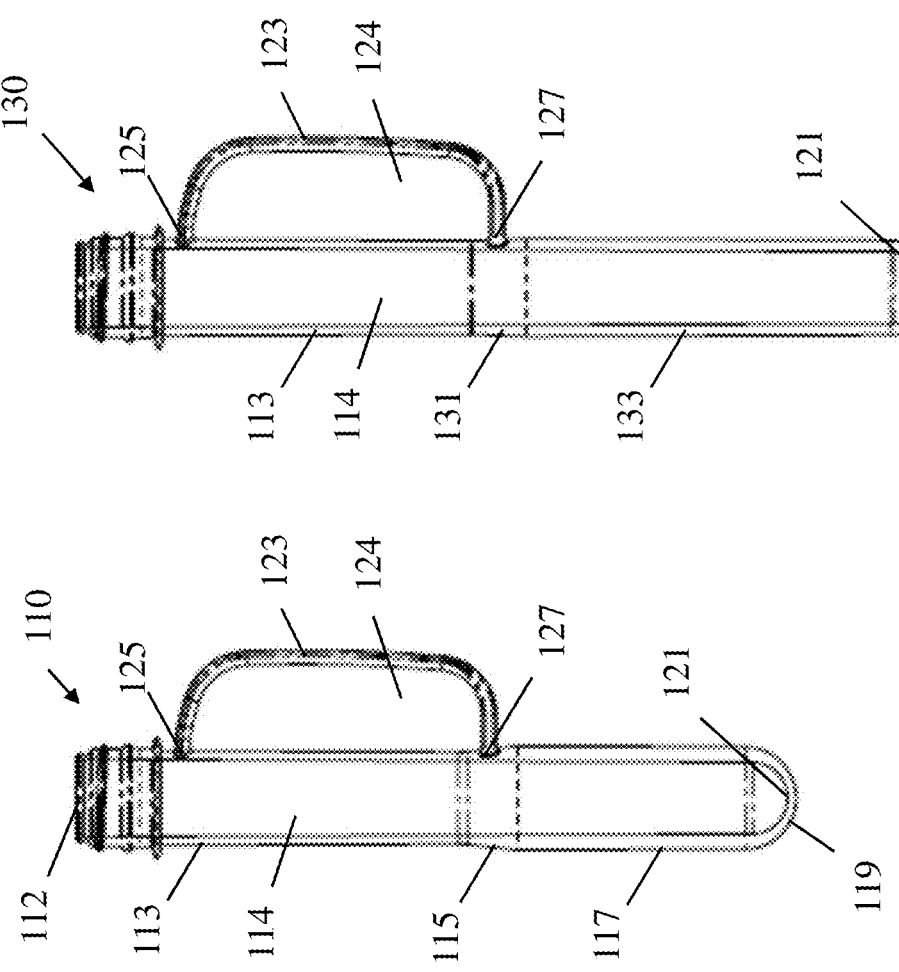

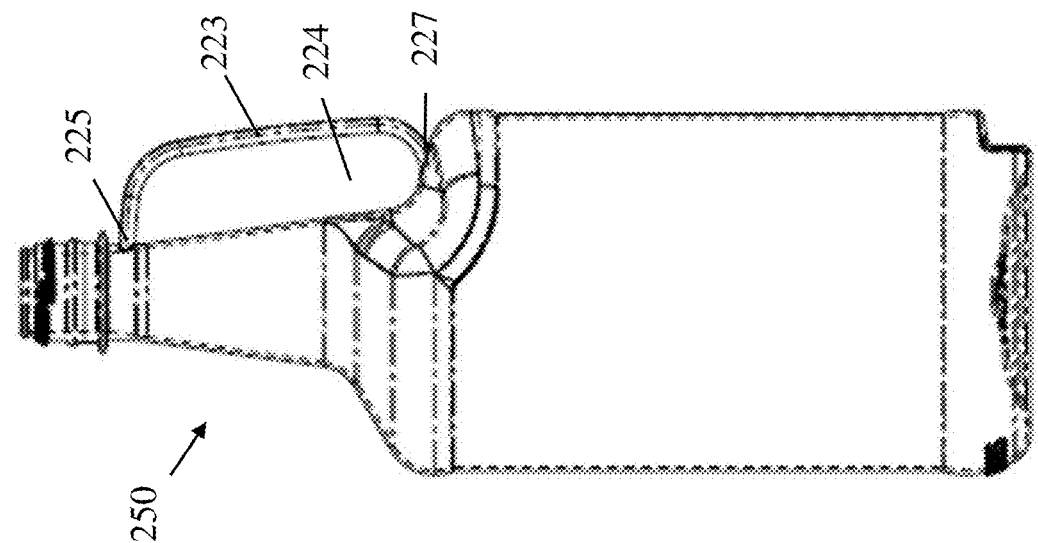
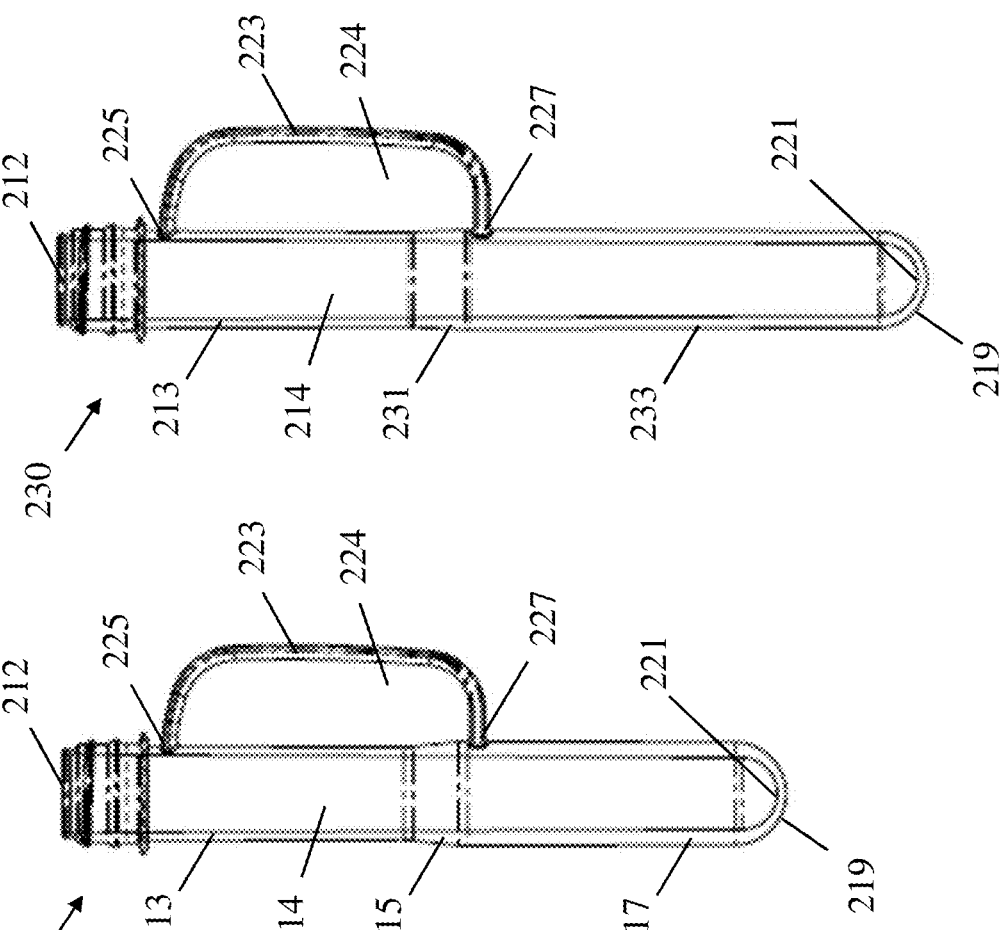

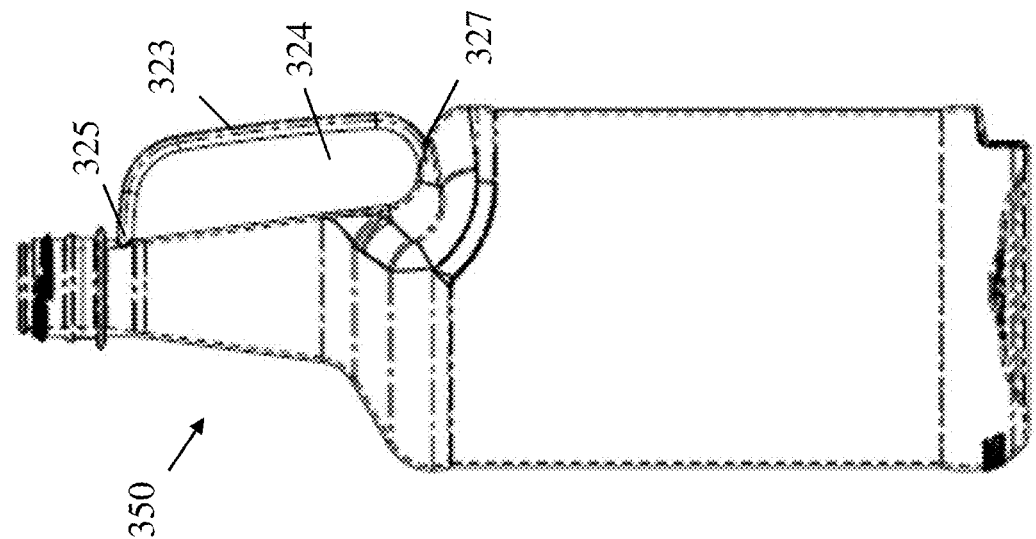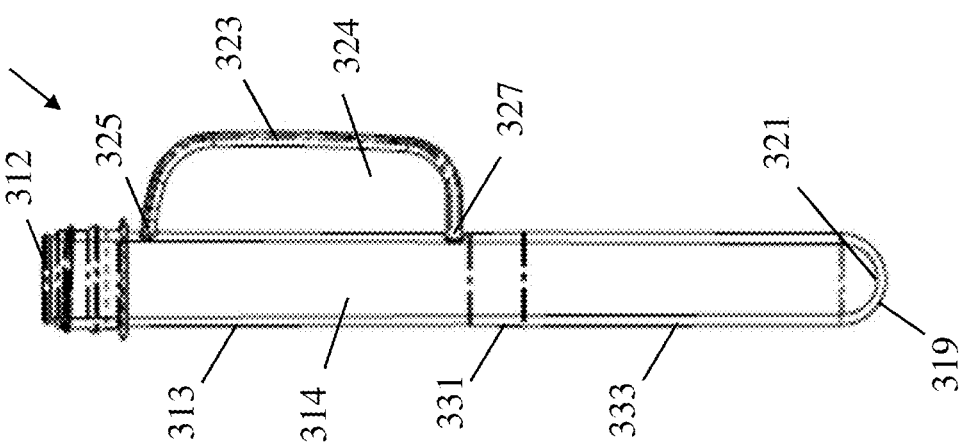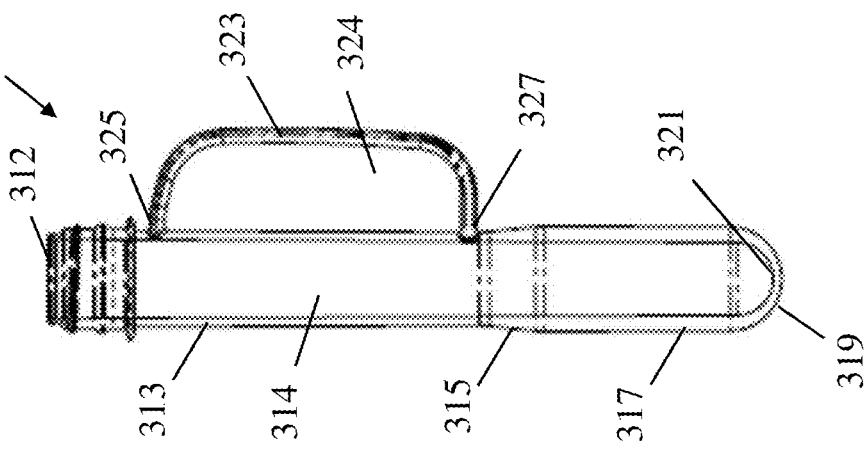

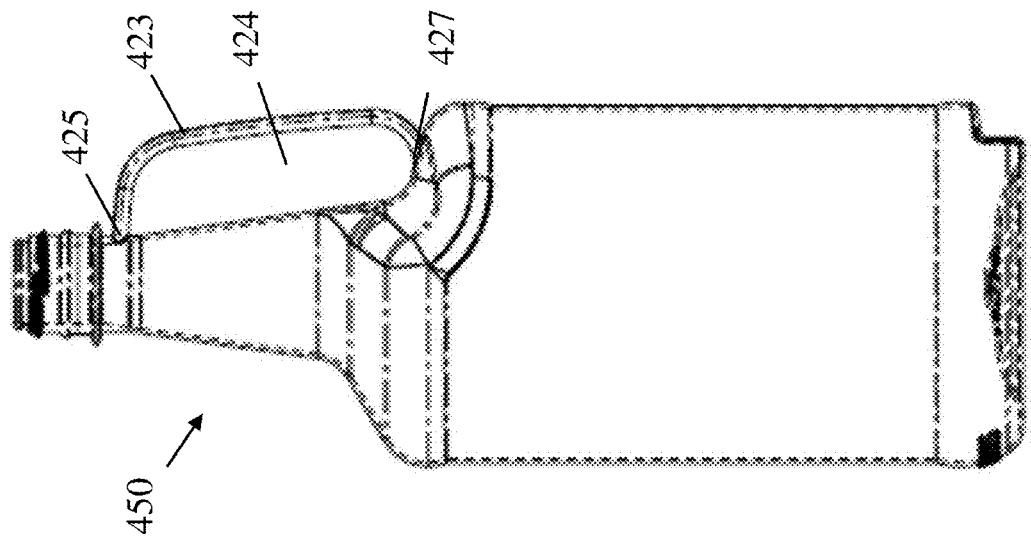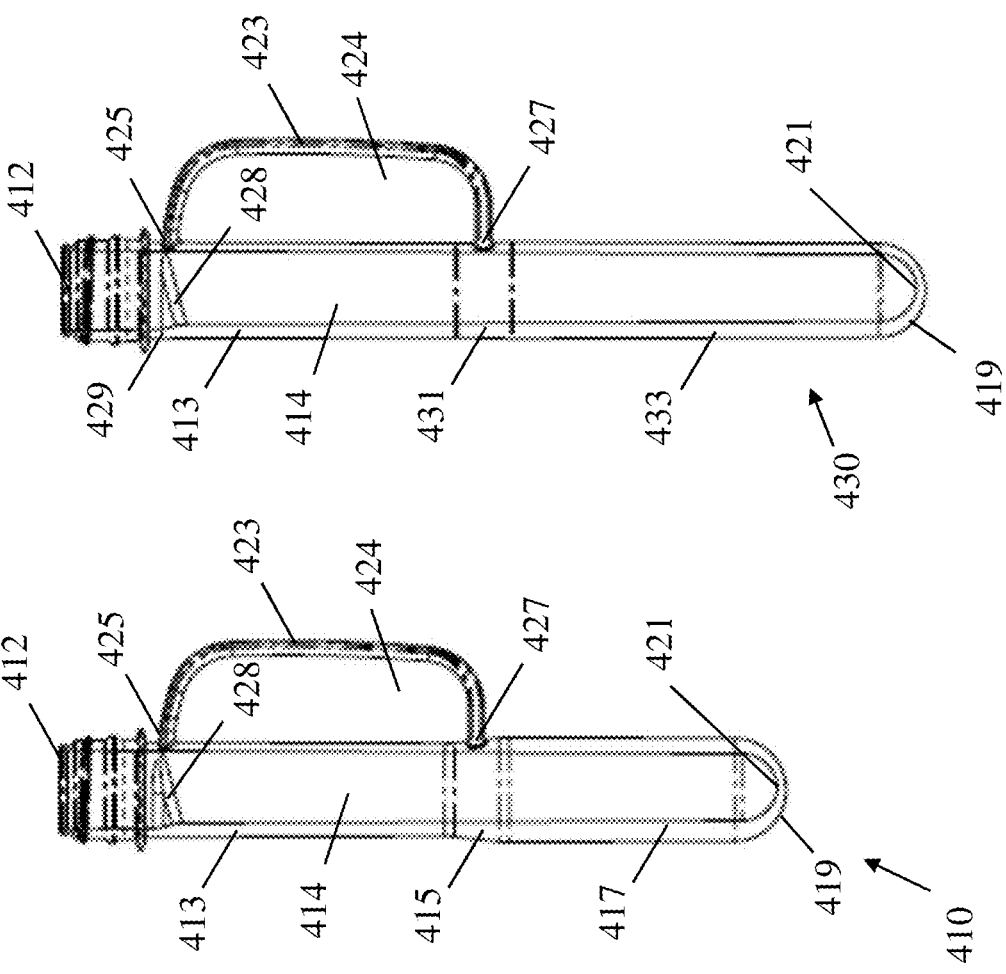

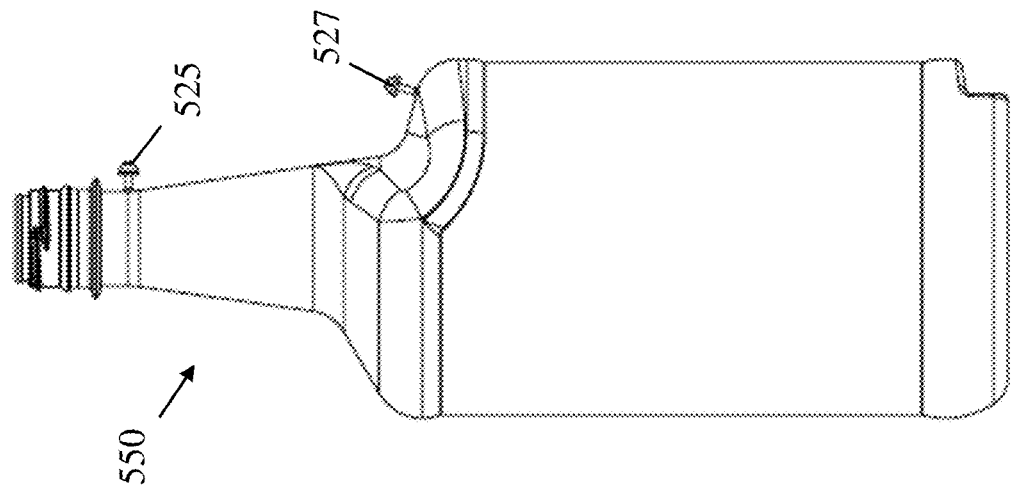
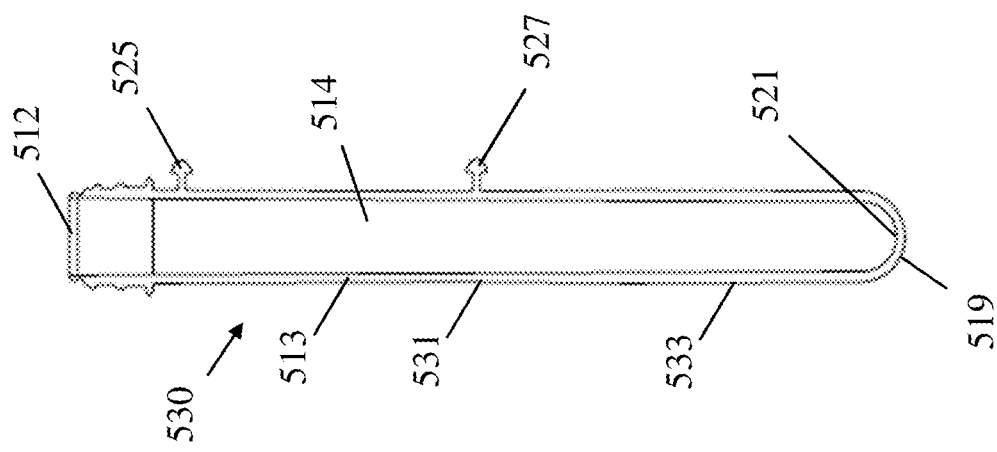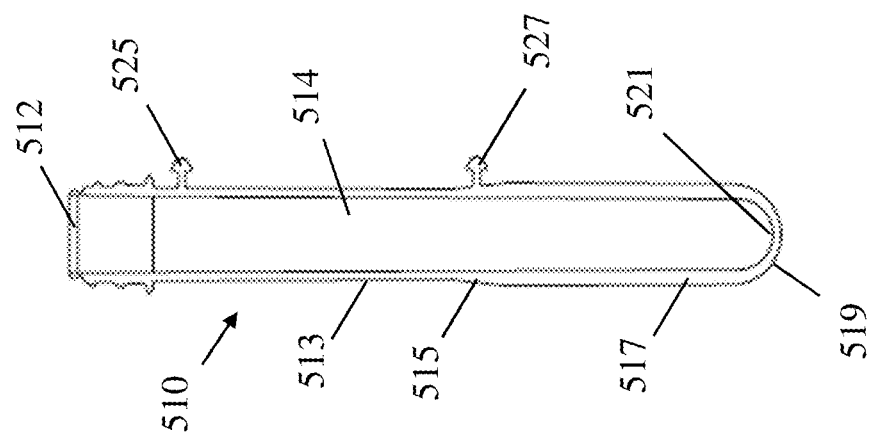

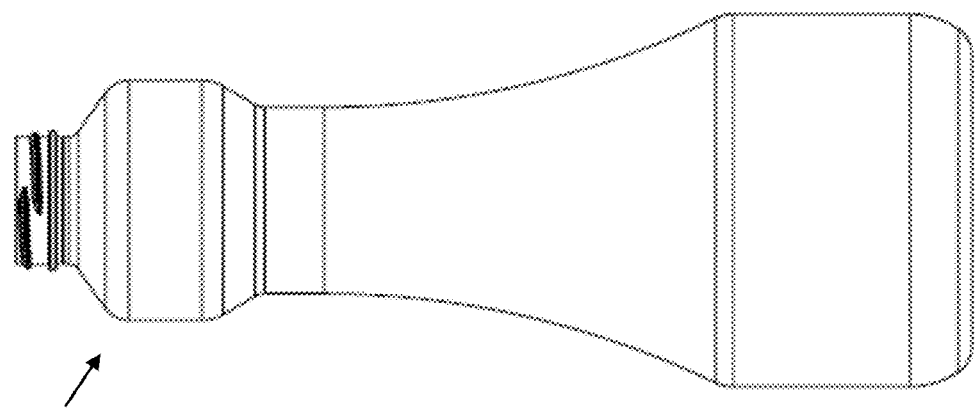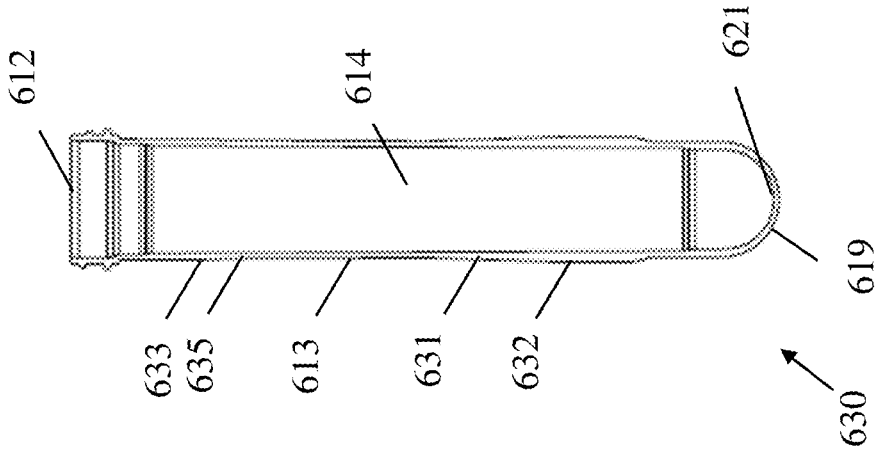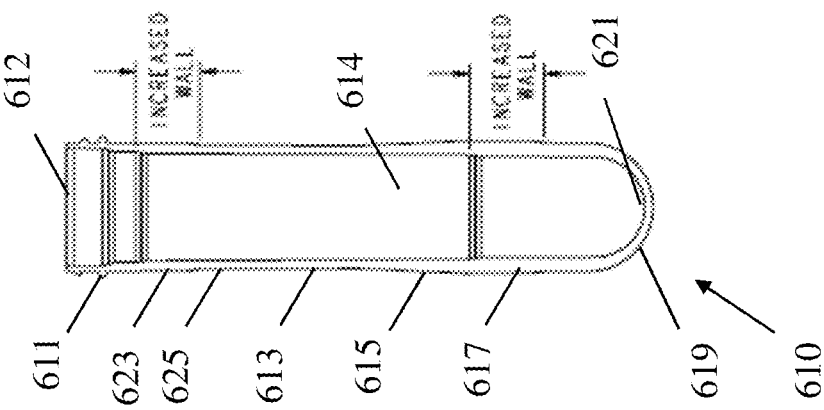

METHOD FOR FORMING A VARIABLE THICKNESS PREFORM FOR A BOTTLE

BACKGROUND

Field of the Disclosure

The present invention relates to a preform for forming a container. More specifically, the present invention relates to a preform for forming a container with a variable thickness.

Description of the Related Art

Conventionally, numerous types of containers, including plastic bottles for holding fluids, are formed by blow molding. For some applications, handles are desired for carrying the container.

The handles are usually attached in a separate process step, after the main body of the container was formed by blow molding. For example, after removal of the formed container main body from the blow mold, the formed container main body may then be transferred to another mold and the handle may be formed onto the formed container main body by injection molding. Alternatively, a separately formed handle may be snapped onto the neck of the formed container main body.

Other examples of methods for forming a container with a handle are set forth in the background section of U.S. Pat. Nos. 8,524,143, 8,524,143 and 9,505,163, which disclose a method for forming a container with an integral handle and a container with an integral handle notch, are hereby incorporated by reference in their entirety.

Additionally, preforms for forming plastic bottles conventionally have a uniform thickness, such that the preform can be easily removed from a preform mold.

SUMMARY

According to one or more embodiments of the present invention, a preform for a container comprises a hollow cylindrical main body having a first thickness, a hollow cylindrical thick portion having a second thickness greater than the first thickness, and a curved end portion, wherein inner surfaces of the main body, the thick portion, and the end portion form a cavity.

According to one or more embodiments of the present invention, an outer diameter of the thick portion is greater than that of the main portion.

According to one or more embodiments of the present invention, an inner diameter of the thick portion is the same as that of the main portion.

According to one or more embodiments of the present invention, a preform for a container comprises a tapered transition portion formed between the main body and the thick portion, such that the thickness increases gradually from the main body to the thick portion.

According to one or more embodiments of the present invention, a preform for a container comprises a threaded neck portion disposed above the main body.

According to one or more embodiments of the present invention, a preform for a container comprises an integral handle attached to the main body at an upper attachment point, and attached to the thick portion at a lower attachment point.

According to one or more embodiments of the present invention, a preform for a container comprises an integral handle attached to the main body at both an upper attachment point and a lower attachment point.

According to one or more embodiments of the present invention, a preform for a container comprises an integral handle attached to the main body at an upper attachment point, and attached to the tapered transition portion at a lower attachment point.

According to one or more embodiments of the present invention, the main body comprises a tapered inner diameter transition portion that gradually decreases an inner diameter of the main body in the downward direction.

According to one or more embodiments of the present invention, a preform for a container comprises an upper handle attachment notch disposed on the main body, and a lower handle attachment notch disposed on the tapered transition portion.

According to one or more embodiments of the present invention, a preform for a container comprises another thick portion disposed on an upper side of the main body and having a third thickness greater than the first thickness, wherein the thick portion is disposed on a lower side of the main body.

According to one or more embodiments of the present invention, a mold for forming a preform comprises a first preform mold comprising a first preform mold cavity that includes a first top opening and a first bottom opening, a second preform mold comprising a second preform mold cavity that includes a second top opening and a second bottom opening, a third preform mold comprising a third preform mold cavity that includes a third top opening, and a third bottom opening, and a rod-shaped inner mold. The first preform mold and the second preform mold are configured to be combined such that the first and second preform mold cavities form a first space corresponding to an outer shape of an upper portion of the preform having a variable outer diameter. The third preform mold cavity has a second space corresponding to an outer shape of a lower portion of the preform having a constant outer diameter. The rod-shaped inner mold is configured to be inserted into the first, second, and third preform mold cavities, and corresponds to an inner cavity of the preform. The third preform mold is structured such that molten plastic can be injected through the third bottom opening.

According to one or more embodiments of the present invention, when the first, second, and third preform molds are combined, the first and second bottom openings of the first and second preform mold cavities communicate with the third top opening of the third preform mold cavity, such that molten plastic injected from the third bottom opening can flow to the first and second preform mold cavities.

According to one or more embodiments of the present invention, the first and second mold cavities comprise recesses in the shape of a handle.

According to one or more embodiments of the present invention, a method for forming a preform comprises closing a first preform mold comprising a first preform mold cavity that includes a first top opening and a first bottom opening, a second preform mold comprising a second preform mold cavity that includes a second top opening and a second bottom opening, such that the first and second preform mold cavities form a first space corresponding to an outer shape of an upper portion of the preform having a variable outer diameter, disposing a third preform mold comprising a third preform mold cavity that includes a third top opening, and a third bottom opening below the closed first and second preform molds, the third preform mold cavity having a second space corresponding to an outer shape of a lower portion of the preform having a constant outer diameter, inserting a rod-shaped inner mold into the first, second, and third preform mold cavities, injecting molten plastic through the third bottom opening into the first, second, and third preform mold cavities, and around an outside of the rod-shaped inner mold, cooling the molten plastic to form a hardened plastic preform, removing the first, second, and third preform molds to expose an outside of the preform, and removing the rod-shaped inner mold from the preform.

According to one or more embodiments of the present invention, the first and second mold cavities comprise recesses in the shape of a handle.

According to one or more embodiments of the present invention, at least a portion of the inner diameter of the closed first and second preform mold cavities is greater than an inner diameter of the third preform mold cavity.

BRIEF DESCRIPTION OF DRAWINGS

Features of the present disclosure will become more apparent from the following description in conjunction with the accompanying drawings.

FIGS. 2A-2D show a manufacturing process for forming a preform according to one or more embodiments of the present invention.

FIGS. 3A-3C show a preform stretching apparatus and a preform stretching process with the preform removed according to one or more embodiments of the present invention.

FIGS. 3D-3F show a preform stretching apparatus and a preform stretching process according to one or more embodiments of the present invention.

FIGS. 5A-5B show a manufacturing process for forming a container from a stretched preform according to one or more embodiments of the present invention.

FIGS. 7A-7C show front views of a preform, a stretched preform, and blown container, according to one or more embodiments of the present invention.

FIGS. 9A-9C show front views of a preform, a stretched preform, and blown container, according to one or more embodiments of the present invention.

FIGS. 11A-11C show front views of a preform, a stretched preform, and blown container, according to one or more embodiments of the present invention.

FIGS. 13A-13C show front views of a preform, a stretched preform, and blown container, according to one or more embodiments of the present invention.

FIGS. 15A-15B show cross-sectional views of a preform and a stretched preform, and FIG. 15C shows a front view of a blown container, according to one or more embodiments of the present invention.

FIGS. 17A-17B show cross-sectional views of a preform and a stretched preform, and FIG. 17C shows a front view of a blown container, according to one or more embodiments of the present invention.

DETAILED DESCRIPTION

Embodiments of the invention will be described in detail below with reference to drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1A:
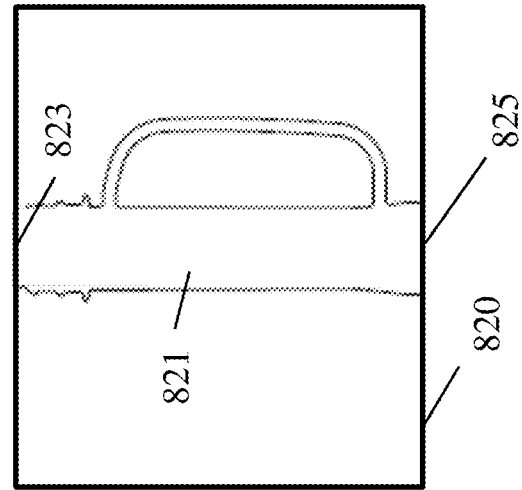
FIGS. 1A and 1B show inside views of a first preform mold and a second preform mold for forming a preform according to one or more embodiments of the present invention.

FIG. 1A shows an inside view of a first preform mold 810 according to one or more embodiments of the present invention. The first preform mold 810 has a first preform mold cavity 811 formed therein. The first preform mold cavity 811 extends to the top and bottom of the first preform mold 810, so that the first preform mold 810 has top opening 813 and a bottom opening 815. Here, the diameter of the bottom opening 815 is equal to a maximum diameter of the bottommost portion of the preform.

Figure 1B:
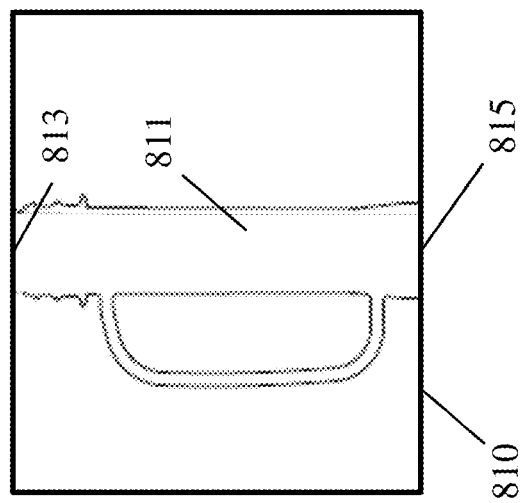

FIG. 1B shows an inside view of a second preform mold 820 according to one or more embodiments of the present invention. The second preform mold 820 has a second preform mold cavity 821 formed therein. The second preform mold cavity 821 extends to the top and bottom of the second preform mold 820, so that the second preform mold 820 has a top opening 823 and a bottom opening 825. Here, the diameter of the bottom opening 825 is equal to a maximum diameter of the bottommost portion of the preform. According to one or more embodiments of the present invention, the second preform mold cavity 821 is a mirror image of the first preform mold cavity 811. Alternatively, the second preform mold cavity 821 may have a different shape from a mirror image of the first preform mold cavity 811.

Figure 1D:
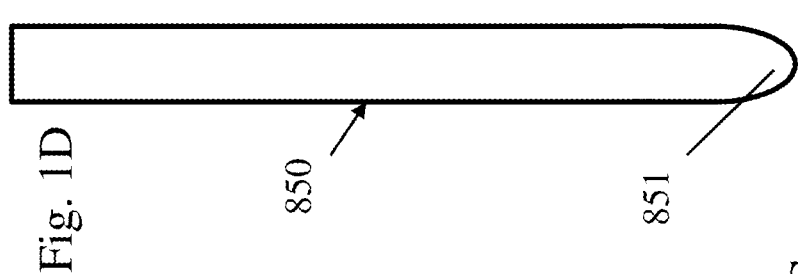
FIG. 1D shows a front view of a rod-shaped inner mold for forming a preform according to one or more embodiments of the present invention.
Figure 1C:
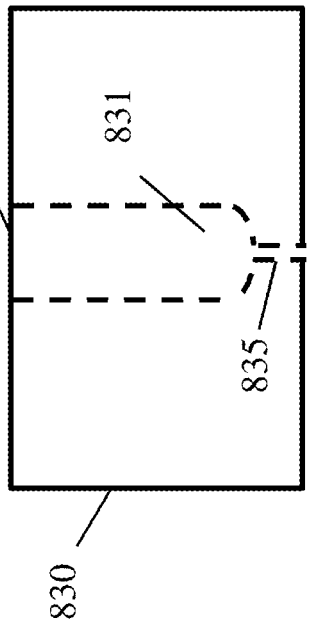
FIG. 1C shows a front view of a bottom preform mold for forming a preform according to one or more embodiments of the present invention.

FIG. 1C shows a front view of a bottom preform mold 830 for forming a preform according to one or more embodiments of the present invention. The bottom preform mold 830 has a third preform mold cavity 831 formed therein. The third preform mold cavity 831 extends to the top of the bottom preform mold 830 to form a top opening 833. The bottom of the third preform mold cavity 831 is within the bottom preform mold 830, with a thin bottom opening 835 through which molten thermoplastic can be injected. The diameter of the top opening 833 of the bottom preform mold 830 is equal to the diameter of the bottom openings 815, 825 of the first and second preform molds 810, 820.

FIG. 1D shows a front view of a rod-shaped inner mold 850 for forming a preform according to one or more embodiments of the present invention. Here, the rod-shaped inner mold 850 has a constant diameter down to the leading edge portion 851 thereof. Alternatively, the rod-shaped inner mold 850 may have variable diameters, as long as the diameter does not increase in the downward direction, because such a shape may prevent the rod-shaped inner mold 850 from being removed from the preform.

Figure 2B:
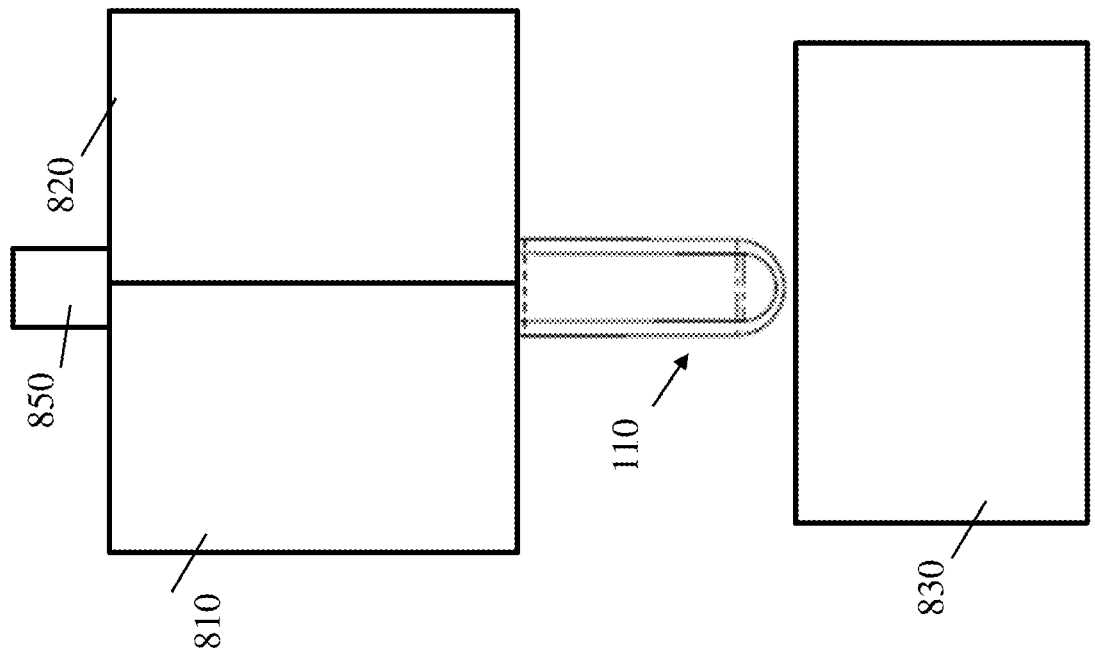
Figure 2A:
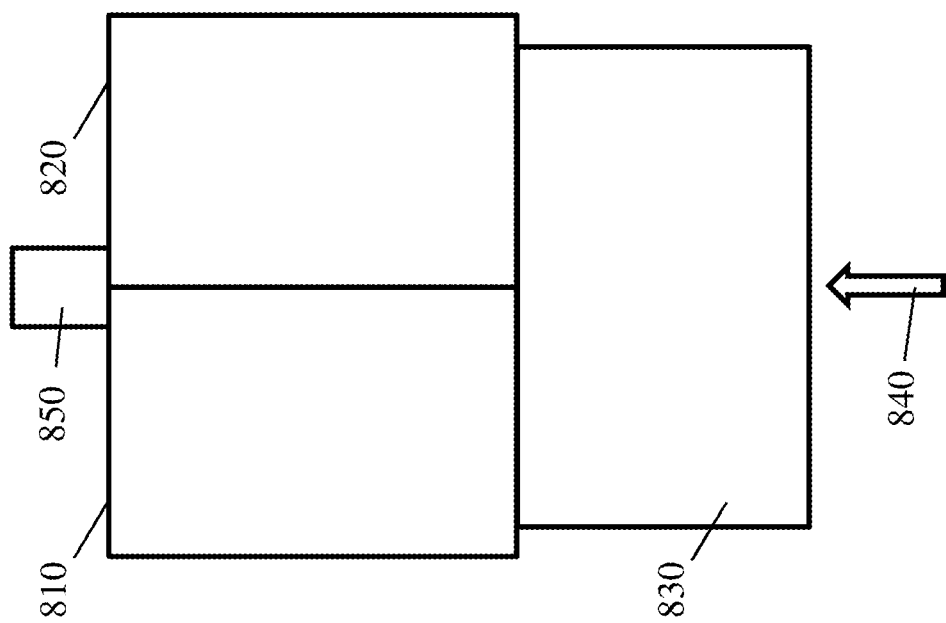

FIGS. 2A-2D show a manufacturing process for forming a preform according to one or more embodiments of the present invention. As shown in FIG. 2A, the first and second preform molds 810, 820 are brought together in the closed portion above the bottom preform mold 830 so that the top opening 833 of the third preform mold cavity 831 lines up with the bottom openings 815, 825 of the first and second preform mold cavities 811, 821. The rod-shaped inner mold 850 is inserted into the closed first and second preform mold cavities 811, 821 and the third preform mold cavity 831 through the top openings 813, 823, 833 thereof. Molten thermoplastic 840 is then injected into the third preform cavity 831 through the thin bottom opening 835 thereof, so as to fill the space inside the third preform mold cavity 831 and up to top of the first and second preform mold cavities 811, 821, except for the space occupied by the rod-shaped inner mold 850. The molten plastic 840 is then allowed to cool. According to one or more embodiments of the present invention, the molten plastic 840 is actively cooled by a cooling mechanism. According to one or more embodiments of the present invention, the cooling mechanism may be one or more of a fan, an air conditioner, and a heat sink.

Figure 6:
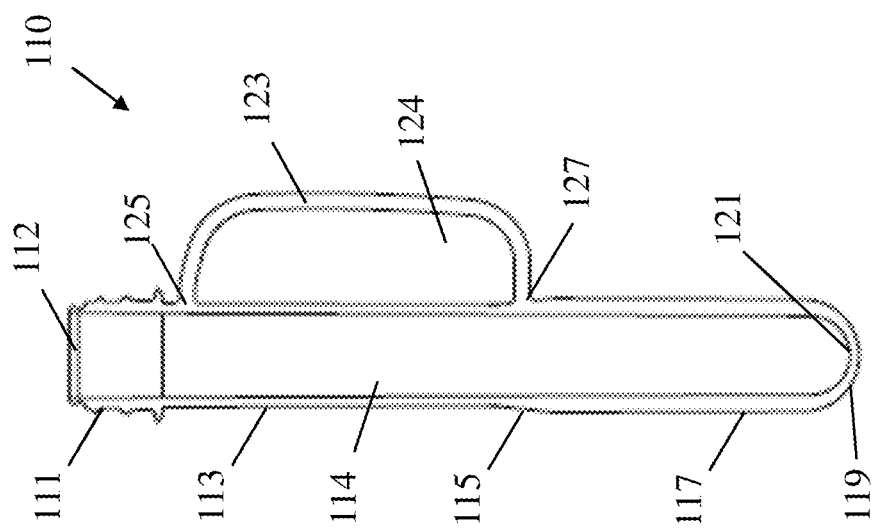
FIG. 6 shows a cross-sectional view of a preform according to one or more embodiments of the present invention.

As shown in FIG. 2B, once the molten plastic 840 is cooled and hardened, the bottom preform mold 830 is removed by sliding downward off of the hardened preform 110, exposing the bottom portion of the preform 110. Subsequently, as shown in FIG. 2C, the first and second preform molds 810, 820 are removed by moving in opposite directions away from the preform 110. Finally, as shown in FIG. 2D, the preform 110 is slid downward off of the rod-shaped inner mold 850 or, alternatively, the rod-shaped inner mold 850 is removed by sliding upward from the preform 110. Thereby, the preform 110 is formed. While the preform 110 shown in FIG. 6 is used as an example in FIGS. 1A-2D, a similar manufacturing process may be employed to form the preforms 210, 310, 410, 510, 610 shown in FIGS. 8, 10, 12, 14, and 16, as well as other preforms.

FIGS. 3A-3C show a preform stretching apparatus 950 and a preform stretching process with the preform removed, according to one or more embodiments of the present invention. The preform stretching apparatus 950 has a base 959 on which a mandrel 953 and a first catching mechanism 955 and a second catching mechanism 957 are disposed. A stretch rod 951 extends upwards from an opening in the base 959 and the mandrel 953. The stretch rod 951 has a leading edge 952 at a topmost portion thereof. As shown in FIG. 3A, the first and second catching mechanisms 955, 957 are initially distanced apart in the lateral direction. As shown in FIG. 3B, the first and second catching mechanisms 955, 957 are actuated to be brought together around the mandrel 953. According to one or more embodiments of the present invention, the actuator for actuating the first and second catching mechanisms 955, 957 are disposed within the base 959. Thereafter, as shown in FIG. 3C, the stretch rod 951 extends vertically upwards from the mandrel 953 and the base 959 to its final position.

FIGS. 3D-3F show a preform stretching apparatus 950 and a preform stretching process according to one or more embodiments of the present invention. As shown in FIG. 3D, a preform 110 is placed upside down around the mandrel 953 and the stretch rod 951. As shown in FIG. 3E, the first catching mechanism 955 and the second catching mechanism 957 are actuated to be brought together around a neck portion 111 of the preform 110, to secure the neck portion 111 therebetween. Thereafter, as shown in FIG. 3F, the stretch rod 951 extends vertically upwards from the mandrel 953 and the base 959 to push on a base 121 of the preform 110, stretching at least the thick portion 117 and a tapered transition portion 115 of the preform 110 until the stretch rod 951 reaches its final position. After the stretch rod 951 reaches its final position, as shown in FIG. 3F, the stretched preform 130 is formed with an upper thinned portion 131 and a lower thinned portion 133 at positions corresponding to the transition portion 115 and the thick portion 117, respectively.

According to one or more embodiments of the present invention, the preform 110 is heated prior to being stretched by the stretch rod 951. According to one or more embodiments of the present invention, the preform 110 is heated while being stretched by the stretch rod 951. For example, U.S. Pat. No. 9,505,163, which is incorporated by reference in the present application, shows examples of heating of a preform prior to stretching with a stretch rod. According to one or more embodiments of the present invention, only the thick portion 117 of the preform 110 and/or the tapered transition portion 115 is heated prior to and/or during stretching by the stretch rod 951. According to one or more embodiments of the present invention, in the orientation shown in FIGS. 3D-3F, only a portion at and/or above a lower attachment point 127 is heated prior to and/or during stretching by the stretch rod 951.

By heating only the thick portion 117 of the preform 110 and/or the tapered transition portion 115, or by heating only a portion at and/or above a lower attachment point 127, the shape of the integral handle 123 may be maintained, without requiring shielding to be placed on the integral handle 123. That is, no warping or unintended stretching of the handle occurs from the heating and/or stretching process. According to one or more embodiments of the present invention, in the orientation shown in FIGS. 3D-3F, only a portion at and/or above a lower attachment point 127 is heated prior to and/or during stretching by the stretch rod 951.

While the preform 110 and stretched preform 130 shown in FIGS. 7A-7B are used as an example in FIGS. 3D-3F, a similar manufacturing process may be employed to stretch the preforms 210, 310, 410, 510, 610 shown in FIGS. 9A, 11A, 13A, 15A, and 17A to form the stretched preforms 230, 330, 430, 530, 630 shown in FIGS. 9B, 11B, 13B, 15B, and 17B, as well as other preforms. Furthermore, while first and second catching mechanisms 955, 957 that are actuated together to secure the neck portion 111 is shown in FIGS. 3D-3F, other catching mechanisms may be employed as well. For example, U.S. Pat. No. 9,505,163, which is incorporated by reference in the present application, shows examples of catching mechanisms. Additionally, other catching mechanisms that are within a skill of a person of ordinary skill in the art may be employed.

Figure 4A:
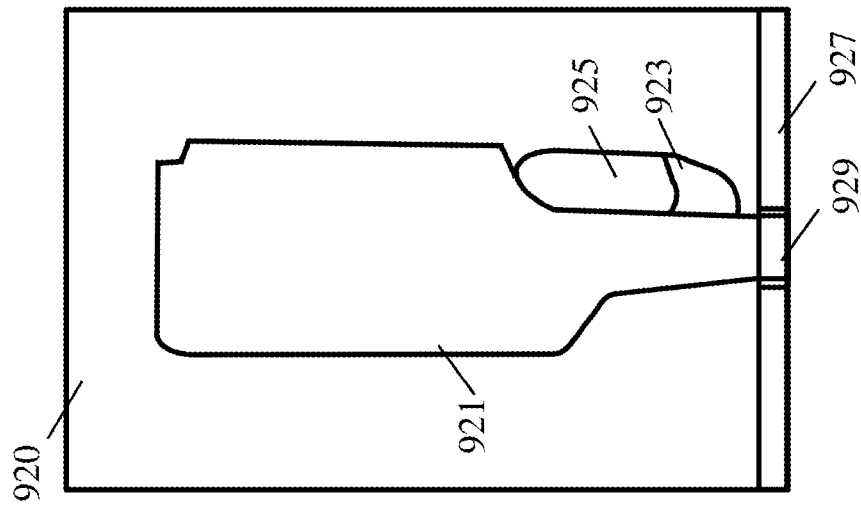
FIGS. 4A-4B show inside views of a first blow mold and a second blow mold according to one or more embodiments of the present invention.
Figure 4B:
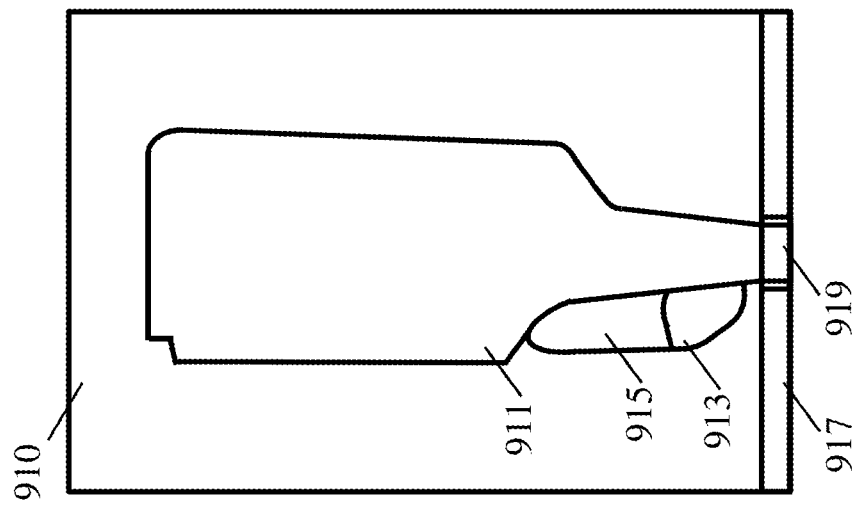

FIG. 4A shows an inside view of a first blow mold 910 according to one or more embodiments of the present invention, and FIG. 4B shows a second blow mold 920 according to one or more embodiments of the present invention. According to one or more embodiments of the present invention, each of the first blow mold 910 and the second blow mold 920 is half of a complete mold, such that when the first blow mold 910 and the second blow mold 920 are brought together, a complete mold is formed. A first mold catch 917 is disposed at the bottom of the first blow mold 910, and a second mold catch 927 is disposed at the bottom of the second blow mold 920. As shown in FIG. 4A, the first blow mold 910 has a first blow mold recess 911 in the shape of one side of the desired container, a lower handle recess 915, and an upper handle pocket wedge block 913. As shown in FIG. 4B, the second blow mold 920 has a second blow mold recess 921 in the shape of the other side of the desired container, an upper handle recess 923, and a lower handle pocket wedge block 925. Examples of the upper handle pocket wedge block 913 and the lower handle pocket wedge block 925 are described in U.S. Pat. No. 9,505,163, which is incorporated by reference in the present application. The first mold catch 917 includes a semicircular first mold catching surface 919, and the second mold catch 927 includes a semicircular second mold catching surface 929.

FIGS. 5A-5B show a manufacturing process for forming a container 150 shown in FIG. 7C from a stretched preform 130 according to one or more embodiments of the present invention. The first blow mold 910 and the second blow mold 920 are initially in the open position shown in FIG. 5A. Once the stretched preform 130 disposed on the mandrel 950 is positioned between the first blow mold 910 and the second blow mold 920, the first blow mold 910 and the second blow mold 920 are brought together to the closed position shown in FIG. 5B. As the first blow mold 910 and the second blow mold 920 are brought together, the first mold catching surface 919 of the first mold catch 917 and the second mold catching surface 929 of the second mold catch 927 are brought together around the neck portion 111 of the stretched preform 130, and the neck portion 111 of the stretched preform 130 is secured by the first and second mold catches 917, 927. Structures and operations of mold catches are described in U.S. Pat. No. 9,505,163, which is incorporated by reference in the present application.

As the first and second blow molds 910, 920 are brought together, the upper handle pocket wedge block 913 that protrudes from the first blow mold 910 is inserted into an upper part of the handle pocket 124 of the stretched preform 130, and into the upper handle recess 923 of the second blow mold 920. Similarly, as the first and second blow molds 910, 920 are brought together, the lower handle pocket wedge block 925 that protrudes from the second blow mold 920 is inserted into a lower part of the handle pocket 124 of the stretched preform 130, and into the lower handle recess 915 of the first mold 910. The tapered cam surface of the upper handle pocket wedge block 913 and the tapered cam surface of the lower handle pocket wedge block 925 function as cams on the integral handle 123, pushing the integral handle 123 into an expanded position. According to one or more embodiments of the present invention, the upper handle pocket wedge block 913 and the lower handle pocket wedge block 925 merely moves the integral handle 123 into its final position on the blown container 150. Alternatively, the upper handle pocket wedge block 913 and the lower handle pocket wedge block 925 may change the shape of the integral handle 123 while moving the integral handle 123 into its final position on the blown container 150, such that the shape of the integral handle 123 is modified. According to one or more embodiments of the present invention, the stretched preform is heated prior to being placed between the first and second blow molds 910, 920. According to one or more embodiments of the present invention, the stretched preform is heated while placed between the first and second blow molds 910, 920.

Once the first and second blow molds 910, 920 are in the closed position shown in FIG. 5B, air is blown into the stretched preform 130 through a mouth portion 112 thereof to form the blown container 150. Alternatively, according to one or more embodiments of the present invention, the blowing of the air into the stretched preform 130 starts while the first and second blow molds 910, 920 are moving to the closed position, so that the movement of the integral handle 123 of the stretched preform 130 to the expanded position occurs concurrently with expansion of the stretched preform 130 during the blowing process. Once the blowing process is complete, and the stretch preform 130 has expanded to fill the first blow mold recess 911 and the second blow mold recess 921 to form the blown container 150, and the blown container 150 is sufficiently cooled, the first and second blow molds 910, 920 are moved apart to an open position so that the blown container 150 may be removed. According to one or more embodiments of the present invention, heated air may be blown into the stretched preform 130.

Although embodiments are described above in which the stretched preform 130 is placed in the first and second blow molds 910, 920 in the open position, the invention is not limited thereto. In one or more embodiments of the present invention, the first and second blow molds 910, 920 may be brought together around a non-stretched preform 110, securing the neck portion 111 of the preform 110 in the first and second mold catching surfaces 919, 929. The stretch rod 950 may then be extended upwards to stretch the preform 110 within the closed first and second blow molds 910, 920 to form the stretched preform 130. However, to do so, the upper and lower handle pocket wedge blocks 913, 925 may be required to be inserted into the first and second blow molds 910, 920 after the stretching is performed.

Additionally, although embodiments are described above in which the upper and lower handle pocket wedge blocks 913, 925 are inserted into the handle pocket 124 of the stretched preform 130 from opposite sides, the invention is not limited thereto. According to one or more embodiments of the present invention, one of the first and second blow molds 910, 920 may have a single handle pocket wedge block that takes up the entirety of the handle pocket 124 to move and/or modify the integral handle 123 by itself.

While the stretched preform 130 and formed container 150 shown in FIGS. 7B and 7C are used as an example in FIGS. 4A-5B, a similar manufacturing process may be employed to form the preforms 210, 310, 410, 510, 610 shown in FIGS. 8, 10, 12, 14, and 16, as well as other preforms.

FIG. 6 shows a cross-sectional view of a preform 110 according to one or more embodiments of the present invention, and FIG. 7A shows a front view of a preform 110 according to one or more embodiments of the present invention. In FIGS. 6 and 7A, the preform 110 is oriented with an open mouth portion 112 at the top. According to one or more embodiments of the present invention, the preform 110 is formed from plastic. The preform 110 has a threaded neck portion 111 at the top, with the open mouth portion 112 formed therein. The preform 110 further has a main body 113 below the neck portion 111, a thick portion 117 below the main body 113, and a semi-spherical end portion 119 formed at the bottom of the preform 110. The preform 110 has a tapered transition portion 115 formed between the main body 113 and the thick portion 117, such that the thickness of the preform increases gradually from the main body 113 to the thick portion 117. The inner surfaces of the neck portion 111, the main body 113, the transition portion 115, the thick portion 117, and the end portion 119 form a cavity 114 of the preform 110. A base 121 of the cavity 114 is formed by the end portion 119.

According to one or more embodiments of the present invention, the neck portion 111, the main body 113, the transition portion 115, and the thick portion 117 have substantially the same diameter, while the outer diameter of the thick portion 117 is greater than that of the main body 113, with the transition portion 115 bridging the two outer diameters. According to one or more embodiments of the present invention, the thickness of the end portion 119 is the same as the thickness of the main body 113. The preform 110 also has a thread stop formed at the bottom of the neck portion 111. According to one or more embodiments of the present invention, an inner circumference of the end portion 119 comprises a small ring-shaped notch for engagement with the stretch rod 950.

According to one or more embodiments of the present invention, the preform 110 is formed with an integral handle 123. The integral handle 123 is attached to the main body 113 at an upper attachment point 125, and to the transition portion 115 at a lower attachment point 127. According to one or more embodiments of the present invention, the lower attachment point 127 is disposed at a middle portion of the transition portion 115. The integral handle 123 extends outwards from the upper attachment point 125, and curves downwards to a straight handle portion, then inwards towards the lower attachment point 127. A handle pocket 124 is formed within the integral handle 123, bounded by the integral handle 123, the main body 113, and a portion of the transition portion 115.

FIG. 7B shows a front view of a stretched preform 130 formed from stretching the preform 110 shown in FIGS. 6 and 7A, according to one or more embodiments of the present invention. The stretched preform 130 is similar to the non-stretched preform 110 above the transition portion 115 as well as the end portion 119 and, therefore, a description thereof is omitted. As shown in FIGS. 7A-7B, the transition portion 115 is stretched by the stretch rod 950 to form the upper thinned portion 131, while the thick portion 117 is stretched by the stretch rod 950 to form the lower thinned portion 133. According to one or more embodiments of the present invention, the main body 113, the upper thinned portion 131, and the lower thinned portion 133 have substantially the same thickness. Alternatively, according to one or more embodiments of the present invention, the main body 113, the upper thinned portion 131, and the lower thinned portion 133 may vary in thickness, albeit to a lesser degree than before stretching.

FIG. 7C shows a front view of a blown container 150 formed from blowing the stretched preform 130 shown in FIG. 7B, according to one or more embodiments of the present invention. According to one or more embodiments of the present invention, a shape of the blown container 150 corresponds to the shape of the first and second blow mold recesses 911, 921 of the first and second blow molds 910, 920. As shown in FIGS. 7B-7C, according to one or more embodiments of the present invention, when the stretched preform 130 is blown, positions of the first and second attachment points 125, 127 shift outwards, such that positions of the integral handle 123 and the handle pocket 124 shift while substantially maintaining the original shapes thereof. Alternatively, according to one or more embodiments of the present invention, a shape and/or thickness of the integral handle 123 and a shape and/or size of the handle pocket 124 may be modified during the blowing process.

Figure 8:
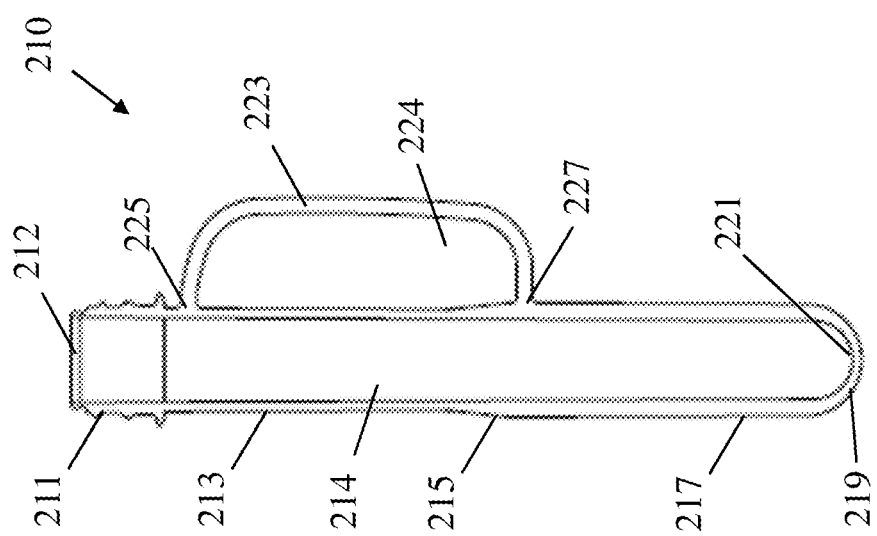
FIG. 8 shows a cross-sectional view of a preform according to one or more embodiments of the present invention.

FIG. 8 shows a cross-sectional view of a preform 210 according to one or more embodiments of the present invention, and FIG. 9A shows a front view of a preform 210 according to one or more embodiments of the present invention. In FIGS. 8 and 9A, the preform 210 is oriented with an open mouth portion 212 at the top. According to one or more embodiments of the present invention, the preform 210 is formed from plastic. The preform 210 has a threaded neck portion 211 at the top, with the open mouth portion 212 formed therein. The preform 210 further has a main body 213 below the neck portion 211, a thick portion 217 below the main body 213, and a semi-spherical end portion 219 formed at the bottom of the preform 210. The preform 210 has a tapered transition portion 215 formed between the main body 213 and the thick portion 217, such that the thickness of the preform increases gradually from the main body 213 to the thick portion 217. The inner surfaces of the neck portion 211, the main body 213, the transition portion 215, the thick portion 217, and the end portion 219 form a cavity 214 of the preform 210. A base 221 of the cavity 214 is formed by the end portion 219.

According to one or more embodiments of the present invention, the neck portion 211, the main body 213, the transition portion 215, and the thick portion 217 have substantially the same diameter, while the outer diameter of thick portion 217 is greater than that of the main body 213, with the transition portion 215 bridging the two outer diameters. According to one or more embodiments of the present invention, the thickness of the end portion 219 is the same as the thickness of the main body 213. The preform 210 also has a thread stop formed at the bottom of the neck portion 211. According to one or more embodiments of the present invention, an inner circumference of the end portion 219 comprises a small ring-shaped notch for engagement with the stretch rod 950.

According to one or more embodiments of the present invention, the preform 210 is formed with an integral handle 223. The integral handle 223 is attached to the main body 213 at an upper attachment point 225, and to an uppermost portion of the thick portion 217 at a lower attachment point 227, immediately below the transition portion 215. The integral handle 223 extends outwards from the upper attachment point 225, and curves downwards to a straight handle portion, then inwards towards the lower attachment point 227. A handle pocket 224 is formed within the integral handle 223, bounded by the integral handle 223 and the main body 213 and a portion of the transition portion 215.

FIG. 9B shows a front view of a stretched preform 230 formed from stretching the preform 210 shown in FIGS. 8 and 9A, according to one or more embodiments of the present invention. The stretched preform 230 is similar to the non-stretched preform 210 above the transition portion 215 as well as the end portion 219 and, therefore, a description thereof is omitted. As shown in FIGS. 9A-9B, the transition portion 215 is stretched by the stretch rod 950 to form the upper thinned portion 231, while the thick portion 217 is stretched by the stretch rod 950 to form the lower thinned portion 233. According to one or more embodiments of the present invention, the main body 213, the upper thinned portion 231, and the lower thinned portion 233 have substantially the same thickness. Alternatively, according to one or more embodiments of the present invention, the main body 213, the upper thinned portion 231, and the lower thinned portion 233 may vary in thickness, albeit to a lesser degree than before stretching.

FIG. 9C shows a front view of a blown container 250 formed from blowing the stretched preform 230 shown in FIG. 9B, according to one or more embodiments of the present invention. According to one or more embodiments of the present invention, a shape of the blown container 250 corresponds to the shape of the first and second blow mold recesses 911, 921 of the first and second blow molds 910, 920. As shown in FIGS. 9B-9C, according to one or more embodiments of the present invention, when the stretched preform 230 is blown, positions of the first and second attachment points 225, 227 shift outwards, such that positions of the integral handle 223 and the handle pocket 224 shift, while substantially maintaining the original shapes thereof. Alternatively, according to one or more embodiments of the present invention, a shape and/or thickness of the integral handle 223 and a shape and/or size of the handle pocket 224 may be modified during the blowing process.

Figure 10:
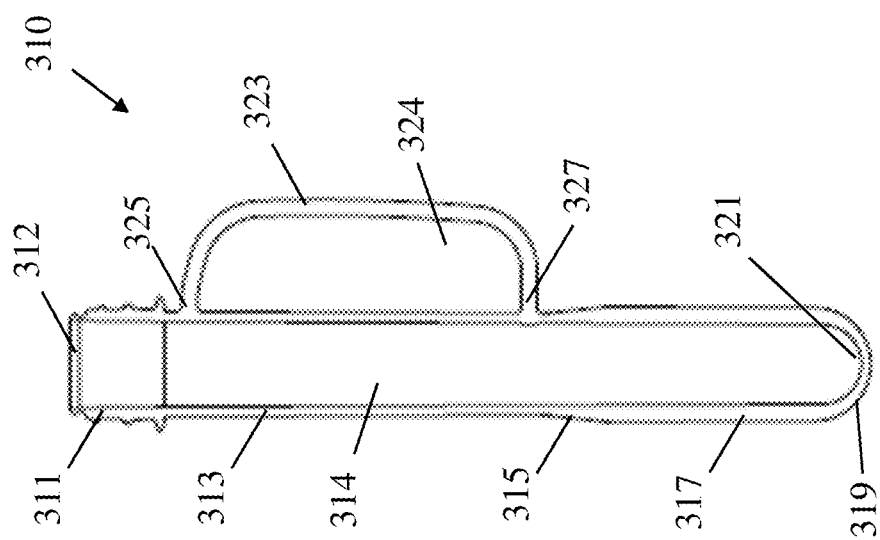
FIG. 10 shows a cross-sectional view of a preform according to one or more embodiments of the present invention.

FIG. 10 shows a cross-sectional view of a preform 310 according to one or more embodiments of the present invention, and FIG. 11A shows a front view of a preform 310 according to one or more embodiments of the present invention. In FIGS. 10 and 11A, the preform 310 is oriented with an open mouth portion 312 at the top. According to one or more embodiments of the present invention, the preform 310 is formed from plastic. The preform 310 has a threaded neck portion 311 at the top, with the open mouth portion 312 formed therein. The preform 310 further has a main body 313 below the neck portion 311, a thick portion 317 below the main body 313, and a semi-spherical end portion 319 formed at the bottom of the preform 310. The preform 310 has a tapered transition portion 315 formed between the main body 313 and the thick portion 317, such that a thickness of the preform increases gradually from the main body 313 to the thick portion 317. The inner surfaces of the neck portion 311, the main body 313, the transition portion 315, the thick portion 317, and the end portion 319 form a cavity 314 of the preform 310. A base 321 of the cavity 314 is formed by the end portion 319.

According to one or more embodiments of the present invention, the neck portion 311, the main body 313, the transition portion 315, and the thick portion 317 have substantially the same diameter, while the outer diameter of thick portion 317 is greater than that of the main body 313, with the transition portion 315 bridging the two outer diameters. According to one or more embodiments of the present invention, the thickness of the end portion 319 is the same as the thickness of the main body 313. The preform 310 also has a thread stop formed at the bottom of the neck portion 311. According to one or more embodiments of the present invention, an inner circumference of the end portion 319 comprises a small ring-shaped notch for engagement with the stretch rod 950.

According to one or more embodiments of the present invention, the preform 310 is formed with an integral handle 323. The integral handle 323 is attached to the main body 313 at an upper attachment point 325 and a lower attachment point 327. According to one or more embodiments of the present invention, the lower attachment point 327 is immediately above the transition portion 315. The integral handle 323 extends outwards from the upper attachment point 325, and curves downwards to a straight handle portion, then inwards towards the lower attachment point 327. A handle pocket 324 is formed within the integral handle 323, bounded by the integral handle 323 and the main body 313 and a portion of the transition portion 315.

FIG. 11B shows a front view of a stretched preform 330 formed from stretching the preform 310 shown in FIGS. 10 and 11A, according to one or more embodiments of the present invention. The stretched preform 330 is similar to the non-stretched preform 310 above the transition portion 315 as well as the end portion 319 and, therefore, a description thereof is omitted. As shown in FIGS. 11A-11B, the transition portion 315 is stretched by the stretch rod 950 to form the upper thinned portion 331, while the thick portion 317 is stretched by the stretch rod 950 to form the lower thinned portion 333. According to one or more embodiments of the present invention, the main body 313, the upper thinned portion 331, and the lower thinned portion 333 have substantially the same thickness. Alternatively, according to one or more embodiments of the present invention, the main body 313, the upper thinned portion 331, and the lower thinned portion 333 may vary in thickness, albeit to a lesser degree than before stretching.

FIG. 11C shows a front view of a blown container 350 formed from blowing the stretched preform 330 shown in FIG. 11B, according to one or more embodiments of the present invention. According to one or more embodiments of the present invention, a shape of the blown container 350 corresponds to the shape of the first and second blow mold recesses 911, 921 of the first and second blow molds 910, 920. As shown in FIGS. 11B-11C, according to one or more embodiments of the present invention, when the stretched preform 330 is blown, positions of the first and second attachment points 325, 327 shift outwards, such that positions of the integral handle 323 and the handle pocket 324 shift, while substantially maintaining the original shapes thereof. Alternatively, according to one or more embodiments of the present invention, a shape and/or thickness of the integral handle 323 and a shape and/or size of the handle pocket 324 may be modified during the blowing process.

Figure 12:
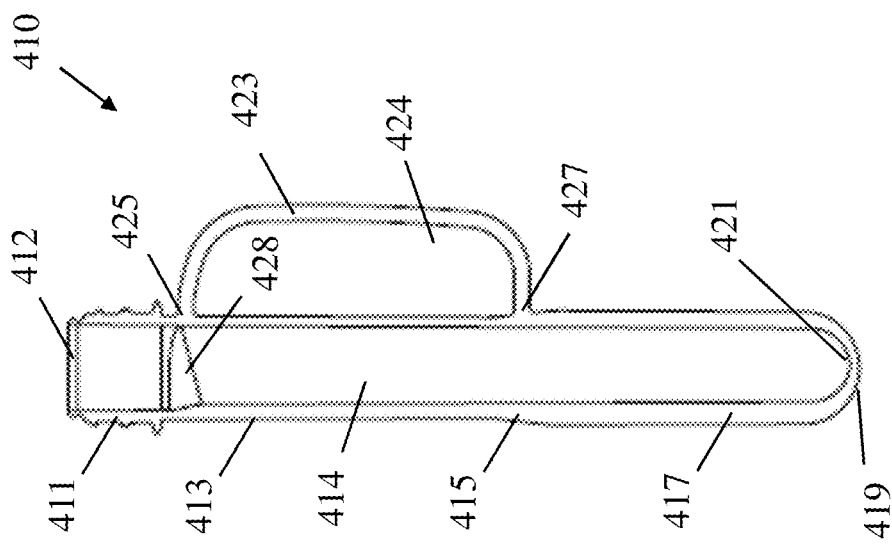
FIG. 12 shows a cross-sectional view of a preform according to one or more embodiments of the present invention.

FIG. 12 shows a cross-sectional view of a preform 410 according to one or more embodiments of the present invention, and FIG. 13A shows a front view of a preform 410 according to one or more embodiments of the present invention. In FIGS. 12 and 13A, the preform 410 is oriented with an open mouth portion 412 at the top. According to one or more embodiments of the present invention, the preform 410 is formed from plastic. The preform 410 has a threaded neck portion 411 at the top, with the open mouth portion 412 formed therein. The preform 410 further has a main body 413 below the neck portion 411, a thick portion 417 below the main body 413, and a semi-spherical end portion 419 formed at the bottom of the preform 410. The preform 410 has a tapered transition portion 415 formed between the main body 413 and the thick portion 417, such that the thickness of the preform increases gradually from the main body 413 to the thick portion 417. The inner surfaces of the neck portion 411, the main body 413, the transition portion 415, the thick portion 417, and the end portion 419 form a cavity 414 of the preform 410. A base 421 of the cavity 414 is formed by the end portion 419.

According to one or more embodiments of the present invention, a lower portion of the main body 413, the transition portion 415, and the thick portion 417 have substantially the same diameter. An inner diameter of the neck portion 411 is larger than that of the lower portion of the main body 413, the transition portion 415, and the thick portion 417. A tapered inner diameter transition portion 428 is formed in the main body 413 between the neck portion 411 and the remainder of the main body 413, bridging the two different diameters. While the tapered inner diameter transition portion 428 is formed at the top of the main body 413 in FIGS. 12-13A, the tapered inner diameter transition portion 428 could also be formed at other portions of the preform 410, as long as the inner diameter decreases or stays the same in the downward direction, such that the stretch rod 950, which may have correspondingly varied diameters, can be inserted into and removed from the cavity 414.

The outer diameter of thick portion 417 is greater than that of the main body 413, with the transition portion 415 bridging the two outer diameters. According to one or more embodiments of the present invention, the thickness of the end portion 419 is the same as the thickness of the main body 413. The preform 410 also has a thread stop formed at the bottom of the neck portion 411. According to one or more embodiments of the present invention, an inner circumference of the end portion 419 comprises a small ring-shaped notch for engagement with the stretch rod 950.

According to one or more embodiments of the present invention, the preform 410 is formed with an integral handle 423. The integral handle 423 is attached to the main body 413 at an upper attachment point 425, and to the transition portion 415 at a lower attachment point 427. According to one or more embodiments of the present invention, the lower attachment point 427 is disposed at a middle portion of the transition portion 415. The integral handle 423 extends outwards from the upper attachment point 425, and curves downwards to a straight handle portion, then inwards towards the lower attachment point 427. A handle pocket 424 is formed within the integral handle 423, bounded by the integral handle 423 and the main body 413 and a portion of the transition portion 415.

FIG. 13B shows a front view of a stretched preform 430 formed from stretching the preform 410 shown in FIGS. 12 and 13A, according to one or more embodiments of the present invention. The stretched preform 430 is similar to the non-stretched preform 410 above the transition portion 415 as well as the end portion 419 and, therefore, a description thereof is omitted. As shown in FIGS. 13A-13B, the transition portion 415 is stretched by the stretch rod 950 to form the upper thinned portion 431, while the thick portion 417 is stretched by the stretch rod 950 to form the lower thinned portion 433. According to one or more embodiments of the present invention, the main body 413, the upper thinned portion 431, and the lower thinned portion 433 have substantially the same thickness. Alternatively, according to one or more embodiments of the present invention, the main body 413, the upper thinned portion 431, and the lower thinned portion 433 may vary in thickness, albeit to a lesser degree than before stretching.

FIG. 13C shows a front view of a blown container 450 formed from blowing the stretched preform 430 shown in FIG. 13B, according to one or more embodiments of the present invention. According to one or more embodiments of the present invention, a shape of the blown container 450 corresponds to the shape of the first and second blow mold recesses 911, 921 of the first and second blow molds 910, 920. As shown in FIGS. 13B-13C, according to one or more embodiments of the present invention, when the stretched preform 430 is blown, positions of the first and second attachment points 425, 427 shift outwards, such that positions of the integral handle 423 and the handle pocket 424 shift while substantially maintaining the original shapes thereof. Alternatively, according to one or more embodiments of the present invention, a shape and/or thickness of the integral handle 423 and a shape and/or size of the handle pocket 424 may be modified during the blowing process.

Figure 14:
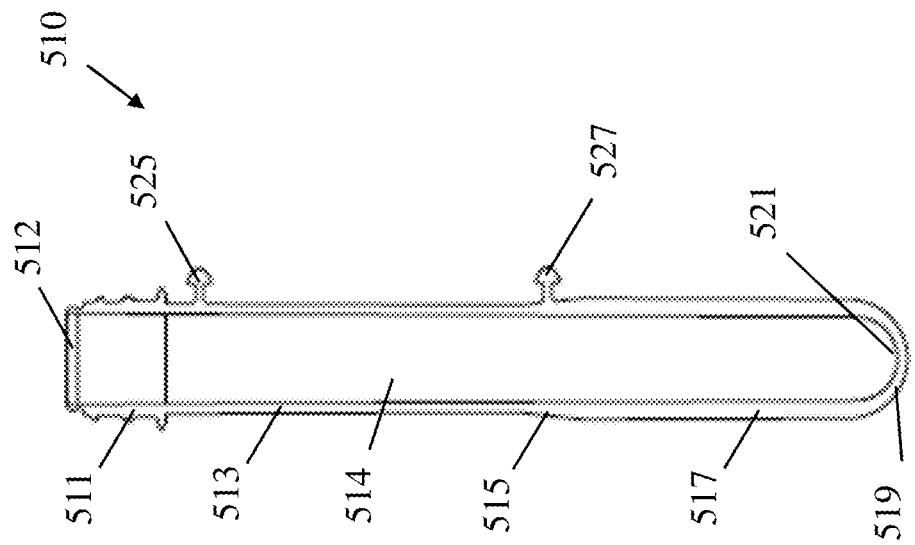
FIG. 14 shows a cross-sectional view of a preform according to one or more embodiments of the present invention.

FIGS. 14 and 15A show cross-sectional views of a preform 510 according to one or more embodiments of the present invention. In FIGS. 14 and 15A, the preform 510 is oriented with an open mouth portion 512 at the top. According to one or more embodiments of the present invention, the preform 510 is formed from plastic. The preform 510 has a threaded neck portion 511 at the top, with the open mouth portion 512 formed therein. The preform 510 further has a main body 513 below the neck portion 511, a thick portion 517 below the main body 513, and a semi-spherical end portion 519 formed at the bottom of the preform 510. The preform 510 has a tapered transition portion 515 formed between the main body 513 and the thick portion 517, such that a thickness of the preform increases gradually from the main body 513 to the thick portion 517. The inner surfaces of the neck portion 511, the main body 513, the transition portion 515, the thick portion 517, and the end portion 519 form a cavity 514 of the preform 510. A base 521 of the cavity 514 is formed by the end portion 519.

According to one or more embodiments of the present invention, the neck portion 511, the main body 513, the transition portion 515, and the thick portion 517 have substantially the same diameter, while the outer diameter of thick portion 517 is greater than that of the main body 513, with the transition portion 515 bridging the two outer diameters. According to one or more embodiments of the present invention, the thickness of the end portion 519 is the same as the thickness of the main body 513. The preform 510 also has a thread stop formed at the bottom of the neck portion 511. According to one or more embodiments of the present invention, an inner circumference of the end portion 519 comprises a small ring-shaped notch for engagement with the stretch rod 950.

According to one or more embodiments of the present invention, the preform 510 is formed with an upper handle attachment notch 525 and a lower handle attachment notch 527. The upper handle attachment notch 525 disposed on the main body 513, and the lower handle attachment notch 527 is disposed on the transition portion 515. According to one or more embodiments of the present invention, the lower handle attachment notch 527 is disposed at a middle portion of the transition portion 515. Alternatively, the lower attachment notch 527 may be disposed on the main body 513 or the thick portion 517.

FIG. 15B shows a cross-sectional view of a stretched preform 530 formed from stretching the preform 510 shown in FIGS. 14 and 15A, according to one or more embodiments of the present invention. The stretched preform 530 is similar to the non-stretched preform 510 above the transition portion 515 as well as the end portion 519 and, therefore, a description thereof is omitted. As shown in FIGS. 15A-15B, the transition portion 515 is stretched by the stretch rod 950 to form the upper thinned portion 531, while the thick portion 517 is stretched by the stretch rod 950 to form the lower thinned portion 533. According to one or more embodiments of the present invention, the main body 513, the upper thinned portion 531, and the lower thinned portion 533 have substantially the same thickness. Alternatively, according to one or more embodiments of the present invention, the main body 513, the upper thinned portion 531, and the lower thinned portion 533 may vary in thickness, albeit to a lesser degree than before stretching.

FIG. 15C shows a front view of a blown container 550 formed from blowing the stretched preform 530 shown in FIG. 15B, according to one or more embodiments of the present invention. According to one or more embodiments of the present invention, a shape of the blown container 550 corresponds to the shape of the first and second blow mold recesses 911, 921 of the first and second blow molds 910, 920, although wedge blocks and handle recesses would not be part of the blow molds 910, 920 for the blown container 550. As shown in FIGS. 15B-15C, according to one or more embodiments of the present invention, when the stretched preform 530 is blown, the first and second handle attachment notches 525, 527 shift outwards. After the blown container 550 is formed, a handle may be attached to the handle attachment notches 525, 527.

Figure 16:
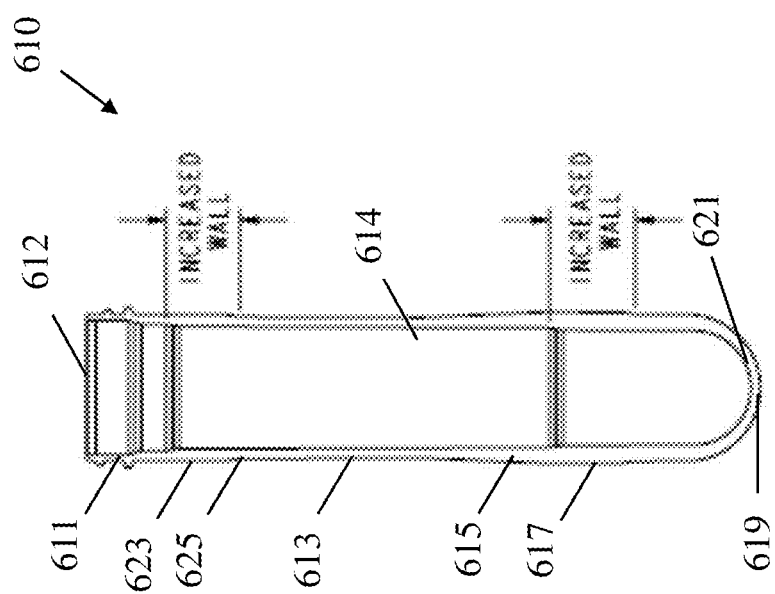
FIG. 16 shows a cross-sectional view of a preform according to one or more embodiments of the present invention.

FIGS. 16-17A show cross-sectional views of a preform 610 according to one or more embodiments of the present invention. In FIGS. 16-17A, the preform 610 is oriented with an open mouth portion 612 at the top. According to one or more embodiments of the present invention, the preform 610 is formed from plastic. The preform 610 has a threaded neck portion 611 at the top, with the open mouth portion 612 formed therein. The preform 610 further has an upper thick portion 623 below the neck portion, a main body 613 below the upper thick portion 623, a lower thick portion 617 below the main body 613, and a semi-spherical end portion 619 formed at the bottom of the preform 610. The preform 610 has an upper tapered transition portion 625 formed between the upper thick portion 623 and the main body 613, and a lower tapered transition portion 615 formed between the main body 613 and the thick portion 617, such that a thickness of the preform increases gradually from the main body 613 to the upper and lower thick portions 617, 623, respectively. The inner surfaces of the neck portion 611, the main body 613, the upper and lower transition portions 625, 615, the upper and lower thick portions 623, 617, and the end portion 619 form a cavity 614 of the preform 610. A base 621 of the cavity 614 is formed by the end portion 619.

According to one or more embodiments of the present invention, the neck portion 611, the main body 613, the upper and lower transition portions 625, 615, and the upper and lower thick portions 623, 617 have substantially the same diameter, while the outer diameter of the upper and lower thick portions 612, 617 are greater than that of the main body 613, with the transition portion 615 bridging the outer diameters. According to one or more embodiments of the present invention, the thickness of the end portion 619 is the same as the thickness of the main body 613. The preform 610 also has a thread stop formed at the bottom of the neck portion 611. According to one or more embodiments of the present invention, an inner circumference of the end portion 619 comprises a small ring-shaped notch for engagement with the stretch rod 950.

FIG. 17B shows a cross-sectional view of a stretched preform 630 formed from stretching the preform 610 shown in FIGS. 16 and 17A, according to one or more embodiments of the present invention. As shown in FIGS. 17A-17B, the upper and lower transition portions 625, 615 are stretched by the stretch rod 950 to form the second and third thinned portions 635, 631, while the upper and lower thick portions 623, 617 are stretched by the stretch rod 950 to form the first and fourth thinned portions 633, 632. According to one or more embodiments of the present invention, the main body 613 and the first, second, third, and fourth thinned portions 633, 635, 631, 632 may vary in thickness, albeit to a lesser degree than before stretching.

FIG. 17C shows a front view of a blown container 650 formed from blowing the stretched preform 630 shown in FIG. 17B, according to one or more embodiments of the present invention. According to one or more embodiments of the present invention, a shape of the blown container 650 corresponds to the shape of the first and second blow mold recesses 911, 921 of the first and second blow molds 910, 920 although wedge blocks and handle recesses would not be part of the blow molds 910, 920 for the blown container 650. Varying the thicknesses of across the stretched preform 630 allows for greater degrees of freedom in shapes of the final blown container 650.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A method for forming a preform, comprising:
closing a first preform mold comprising a first preform mold cavity that includes a first top opening and a first bottom opening;
closing a second preform mold comprising a second preform mold cavity that includes a second top opening and a second bottom opening,
wherein the first and second preform mold cavities:
form a first space corresponding to an outer shape of an upper portion of the preform having a variable outer diameter; and
comprise recesses in a shape of a handle that forms a closed handle pocket;
disposing a third preform mold comprising a third preform mold cavity that includes a third top opening, and a third bottom opening below the closed first and second preform molds, the third preform mold cavity having a second space corresponding to an outer shape of a lower portion of the preform having a constant outer diameter;
inserting a rod-shaped inner mold into the first, second, and third preform mold cavities,
injecting molten plastic through the third bottom opening into the first, second, and third preform mold cavities, and around an outside of the rod-shaped inner mold;
cooling the molten plastic to form a hardened plastic preform;
removing the first, second, and third preform molds to expose an outside of the preform; and
removing the rod-shaped inner mold from the preform, wherein the preform, which is formed by the first, second, and third preform mold cavities and the inserted rod-shaped inner mold, comprises:
a hollow cylindrical main body having a first thickness;
a hollow cylindrical first thick portion having a second thickness greater than the first thickness;
a tapered transition portion formed between the main body and the first thick portion, such that a thickness of the preform in the tapered transition portion increases gradually from the first thickness of the main body to the second thickness of the first thick portion along a downward longitudinal direction of the preform;
an integral handle that corresponds to the recesses formed in the first and second mold cavities, where the integral handle is directly attached to the main body at both an upper attachment point and at a lower attachment point disposed on a main body side of the tapered transition portion along the downward longitudinal direction,
where the upper and lower attachment points are opposite ends of the integral handle that correspond to upper and lower bounds of the closed handle pocket on the main body and comprise the same first thickness of the main body, and
where the lower attachment point is attached to the main body immediately above the tapered transition portion in an upward longitudinal direction; and
a curved end portion, where inner surfaces of the main body, the first thick portion, and the curved end portion form a cavity that corresponds to the rod-shaped inner mold,
wherein the first, second, and third preform mold cavities and the inserted rod-shaped inner mold are shaped to form:
an outer diameter of the first thick portion that is greater than that of the main body, and an inner diameter of the first thick portion that is the same as that of a lower portion of the main body in the downward longitudinal direction.

2. The method according to claim 1, wherein the tapered transition portion formed between the main body and the first thick portion is formed such that an outer diameter of the preform increases gradually from the main body to the first thick portion along the downward longitudinal direction.

3. The method according to claim 1, wherein the first and second preform mold cavities are shaped to form a threaded neck portion disposed above the main body in the upward longitudinal direction.

4. The method according to claim 3, wherein the first, second, and third preform mold cavities and the inserted rod-shaped inner mold are shaped to form an upper portion of the main body with a tapered inner diameter transition portion that, in the downward longitudinal direction, gradually decreases from an inner diameter of the threaded neck portion to the inner diameter of the lower portion of the main body that is the same as that of the first thick portion.

\* \* \* \* \*